United States Patent [19]
Strankman

[11] Patent Number: 6,109,552
[45] Date of Patent: Aug. 29, 2000

[54] AGRICULTURAL FEED BAG UNLOADING APPARATUS

[76] Inventor: Douglas R. Strankman, P.O. Box 250, Blackfalds, Alberta, Canada, T0M 0J0

[21] Appl. No.: 09/274,098

[22] Filed: Mar. 23, 1999

[51] Int. Cl.[7] .................................................. B02C 21/02
[52] U.S. Cl. .............................. 241/101.72; 241/101.742; 241/186.35; 241/605
[58] Field of Search ...................... 241/101.72, 101.742, 241/186.35, 605, 101.74

[56] References Cited

U.S. PATENT DOCUMENTS

| | | |
|---|---|---|
| 2,762,141 | 9/1956 | Le Tourneau ........................ 241/605 X |
| 3,208,491 | 9/1965 | Bliss ................................... 241/605 X |
| 3,923,257 | 12/1975 | Reber . |
| 3,985,305 | 10/1976 | Williamson et al. . |
| 4,065,062 | 12/1977 | Heslop . |
| 4,109,875 | 8/1978 | Condarco et al. . |
| 4,157,164 | 6/1979 | Helm et al. . |
| 4,187,990 | 2/1980 | Lundahl et al. ........................... 241/30 |
| 4,243,346 | 1/1981 | Wolf . |
| 4,420,119 | 12/1983 | Johnson . |
| 4,428,537 | 1/1984 | Heide ................................ 241/101.742 |
| 5,368,242 | 11/1994 | Fish . |
| 5,495,987 | 3/1996 | Slaby . |

*Primary Examiner*—John M. Husar
*Attorney, Agent, or Firm*—Miles & Stockbridge P.C.; John C. Kerins

[57] ABSTRACT

An apparatus for unloading compacted agricultural feed from an elongated storage bag of the type formed from sheet plastic material. The apparatus includes a wheeled framework having a front part for facing an open end of the bag and a transversely extending rotating cylindrical mounted on pivoting arms for fragmenting the feed exposed at the open end of the bag and transferring the feed rearwardly into a transverse trough which has a conveyor system for transporting the fragmented feed to an area of removal. A lower transverse roller has an outer surface for driving engagement with a lower portion of the sheet material forming the bag beneath the compacted contents of the bag and upon rotation of the roller developing a pull on the framework to thereby move the apparatus towards the open end of the bag. The winding up of the lower portion of the sheet material causes a raising of the sheet material from the ground to at least the level of a front edge of the trough to provide an upper surface over which the feed is delivered to the trough and further results in a storage of the continuous plastic material as it is removed from the bag.

31 Claims, 16 Drawing Sheets

AGRICULTURAL FEED BAG UNLOADING APPARATUS

FIELD OF THE INVENTION

This invention relates to an apparatus for unloading feed, such as silage and the like, from an agricultural feed storage bag of the type formed of an elongated tubular flexible sheet plastic material.

BACKGROUND OF INVENTION

Elongated feed storage bags which extend horizontally on the ground surface have become a common replacement for the conventional vertical silos and bunker type storage of silage feed. The use of such bags requires considerable less capital cost, and they are capable of storing large quantities of feed with little spoilage. On the other hand, more work is usually involved in removing the feed as required from the bag and frequently more wastage occurs as compared to using common unloaders such as used in upright silos.

The most conventional manner of unloading the bag involves scooping the feed from an open end of the bag with a front-end loader or the like, and dumping the feed into a feed trough, a wagon or other carrier for moving the feed to an intake site of a feed system or a site directly available to the livestock. This process is not unlike that commonly used with bunker type storage of feed. The use of the storage bag, however, has a further disadvantage of having to cope with the loose plastic sheeting from the bag at the site of loading from the bag and its subsequent disposal.

There have been various proposals of machines for removing of silage stored in stacks on the ground or contained in bunkers or the like and simultaneously loading the removed silage into a wagon, but in the main, such machines are not generally in use because of their cost and the fact front-end loaders, which are usually readily available at cattle operations, are often capable of doing a relatively good job of breaking silage from the pile and moving it away as required. As indicated above, the removal of silage from a feed storage bag, on the other hand, presents problems somewhat different than those relating to bunker silos and the like because of the presence of the plastic sheet material, and this is certainly so in the case when a front end loader is being utilized. While attempts have been made to provide an unloading apparatus for use with feed storage bags, such as shown in U.S. Pat. No. 4,420,119, Dec. 13, 1983, to V. V. Johnson, as far as it can be determined, unloaders of this type, or of any type useful in unloading bags are not widely available on a commercial basis. It is believed that attempts to provide an apparatus to remove silage from feed storage bags has generally been unsuccessful due to the complexity of proposed self-contained machines which present a cost problem and to the fact they have not been capable of dealing with the variations in the size of bags utilized, and particularly, with the irregularities in the shapes assumed by such bags. The bags used for storing agricultural feed are purchased on the basis of desired diameter, and depending on a number of factors, such as the type of forage used, its moisture content at time of harvesting, and the initial compression achieved when filling the bag, the final cross sectional shape of the compacted mass of silage and size of the bag contents vary considerably after fermentation. Moreover, other features, such as the straightness of the horizontal axis of the elongated bag, vary from bag to bag as filled.

SUMMARY OF THE INVENTION

It is an object of the present invention to provide an apparatus of relatively simple and economical structure and one which is capable of readily removing silage from feed storage bags while coping with variations in conditions presented by such bags.

According to the invention, there is provided an apparatus for removing compacted feed, such as silage and the like, from an open end of an agricultural feed storage bag of the type formed of an elongated tubular flexible sheet material, the apparatus having a front part for facing the open end of the bag and ground engaging means which supports the framework for normal travel over the ground towards the open end of the bag in a direction substantially coinciding with a longitudinal axis of the bag. There is provided a conveyor system which includes a feed collecting means and a transporting means for carrying feed from the feed collecting means to an area of removal, the feed collecting means extending substantially across the framework and defining a forward edge adjacent the front part of the framework. A feed transfer means projects forwardly for engaging the compacted feed exposed at the open end of the bag and moving feed towards the feed collecting means, and an advancing means is provided for drawing the framework over the ground towards the open end of the bag and in a direction of the longitudinal axis of the bag. The advancing means includes a lower roller means mounted on the framework for rotation about a transverse, horizontal axis extending normal to the longitudinal axis of the bag, the lower roller means presenting an outer surface for driving engagement with a lower portion of the sheet material extending from beneath the compacted feed in the bag. A roller drive means is provided for rotating the lower roller means so as to develop a pull on the framework and move it toward the open end of the bag. The lower roller means further forms a sheet raising portion for directing the lower portion of said sheet upward from the ground relative to said framework and adjacent the forward edge of the feed collecting means.

In a specific embodiment of the invention, the collecting means includes an open topped, feed collecting trough member extending substantially the width of the framework adjacent the front part of the framework and presenting a forward transverse upper edge and further including a conveyor means for transporting feed from the trough member to the area of removal. The feed transfer means is in the form of a feed comminuting and transfer means including arm means having a rear end portions mounted on pivot means carried by the framework rearwardly and above the trough member and a forward end portion extending forwardly of the trough member. A transversely extending cylindrical member, which has projections thereon is mounted for rotation on the forward end portions of the side arm members. Second drive means is provided for rotating the cylindrical member for fragmenting the compacted feed, and elevating means is arranged to pivot the arm means about the rear end portion so as to move the cylindrical member along an arcuate path between a raised position proximate a top surface of the compacted feed and a lowered position forward of the roller means.

BRIEF DESCRIPTION OF DRAWINGS

In the accompanying drawings which show embodiments of the present invention by way of examples.

Figure 2:
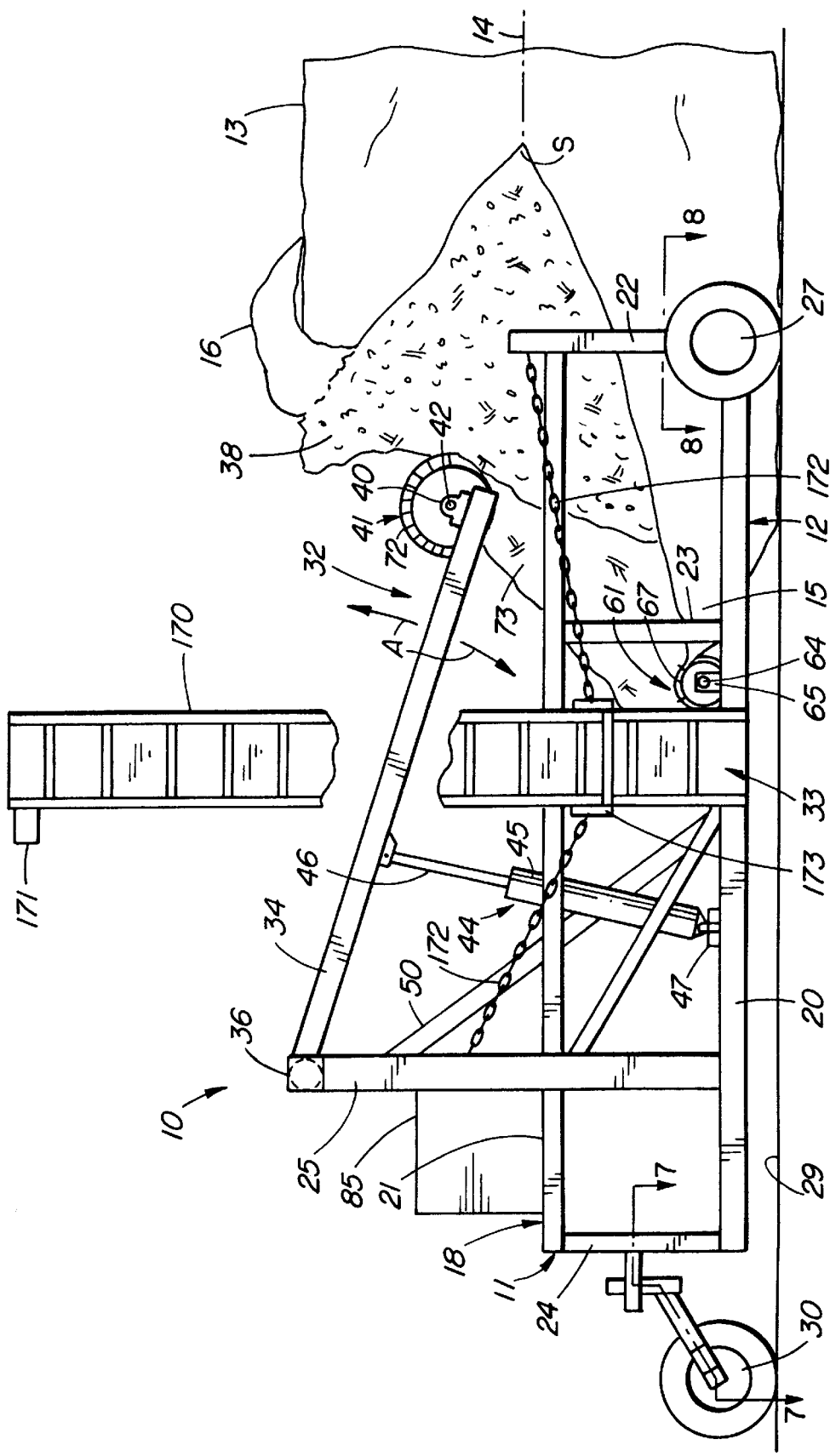
FIG. 2 is a side elevational view as seen from the right side of FIG. 1.

In the drawings reference numbers corresponding to those used in the following description are used to denote like parts, and wherein 10 is utilized to generally indicate the bag unloading apparatus of the present invention. The unloading apparatus 10 includes an overall framework 11 having a front part 12, which, during operation, faces an open end of an agricultural feed storage bag 13 of the type formed of an elongated tubular member formed of flexible plastic sheet material. The feed bag when in a filled condition, such as when containing compacted and fermented feed in the form of silage and the like, lies on the ground surface in an extended form of a somewhat flattened cylindrical cross sectional shape having a central longitudinal axis 14. As will be described in more detail below, when the unloading apparatus 10 is located in front of an end of the bag, with the front part 12 thereof facing an opened end of the bag, the tubular member forming the bag is initially slit along horizontal lines at opposite sides of the bag (FIG. 2). The slits are made above the ground level and are substantially parallel to the axis 14 of the bag at opposite sides thereof, as shown at S in FIG. 2, thus forming a lower portion 15 and an upper portion 16 of the sheet material of the bag.

Figure 1:
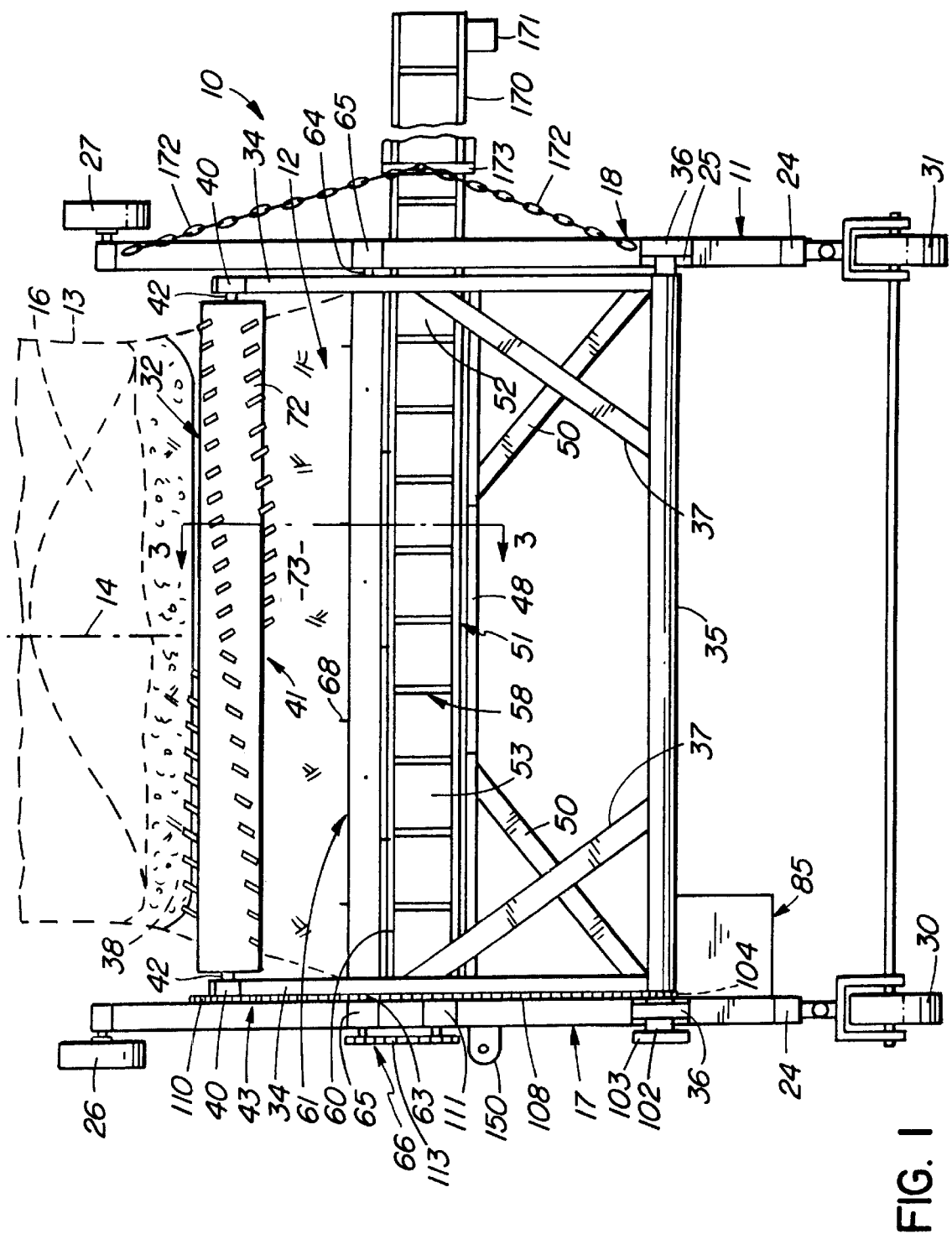
FIG. 1 is a plan view of one embodiment of the apparatus of the present invention.

The framework 11 has main side components 17,18 shown at the left and right hand sides, respectively, as viewed in FIG. 1, and which are of similar construction, each including a horizontal lower beam member 20 and an horizontal upper beam member 21 parallel to lower member 20 and connected thereto by vertical members 22, 23 and 24. The side components 17,18 also include upright columns 25 which are situated more to the rear of the framework and have upper ends positioned well above the upper beam member 18. It will be noted that in the embodiment of the invention shown in FIGS. 1 and 2, transversely spaced forward portions of the side components 17,18 extend forward of the open end of the bag 13. The framework 11 is mounted on ground engaging means shown in the form of wheel means including a pair of front wheels 26,27 at the extreme front ends of side components 17,18 respectively, and a pair of rear wheels 30 and 31 at the rear ends of the side components 17,18, respectively. When the unloading apparatus is in its normal operating mode, the wheels are all oriented so as to allow the framework to travel in a path coinciding with the central axis 14 of the bag 13, i.e., wheels are positioned to rotate about transverse axes. As will be described in more detail below the wheels include features which allows control of the steer of the framework 11 so as to properly track in the proper direction during normal unloading operations and also which permit convenient sideways travel of the apparatus when movement of the apparatus 10 from one site to another is required. As is most apparent from FIG. 1, the front part 12 of the framework 11 is effectively open, i.e., the front portions of the main side components 17,18 are spaced without any transverse frame members extending therebetween in the front part of the apparatus. The spacing of the side components is sufficient to allow the main side components 17,18 to straddle the sides of the bag 13 with ample clearance, it being apparent that the width of the apparatus is selected to accommodate the largest diameter bag the apparatus is expected to encounter.

Mounted between the open front part 12 of the framework is a forwardly extending feed transfer means 32 which engages compacted feed 38 exposed at the open end of the bag. The feed transfer means performs the functions of comminuting the compacted feed and moving it towards a conveyor system 33 which collects and transports the broken-up feed to an area of removal as will be described in more detail below. The feed transfer means 32 includes arm means in the form of a pair of rigid, laterally spaced, side arms 34,34, which are disposed for swinging movement immediately within the side components 17,18 of the framework 11. The side arms 34,34, have rear end portions thereof affixed to a transverse tubular member 35 which in turn has opposite ends journalled for rotation within opposite bearing members 36,36 carried at the upper ends of the upright columns 25,25. To rigidify the overall structure formed by the side arms 34,34 and the transverse tubular member 35, there are provided diagonal reinforcing members 37,37, which extend between the side arms and the tubular member 35. At a forward end portion of each arm 34, there is provided a bearing member 40. The feed transfer means 32 further includes a cylindrical member 41, which has shafts 42 extending from opposite ends thereof received in the bearing members 40,40 so that the cylindrical member 41 is thereby rotatably carried at the forward ends of the side arms 34,34. Drive means 43 is provided for rotating the cylindrical member 41 and it will be described in more detail below. An elevating means 44 (FIG. 1) is connected between each side arm 43 and supports 47 provided on lower beams 17,18 located below the respective side arm. Such elevational means 44 is provided at each side and is shown in the form of a piston and cylinder type motor, commonly termed a double acting hydraulic cylinder. As can be seen from FIG. 2, lower ends of a cylinder members 45 of each hydraulic cylinder is pivotally connected to the support 47 carried by lower beam member 20, and a piston rod 46 extending from an upper end of each cylinder member 45 is pivotally connected to the side arm 34. As will be described in more detail below, a control system is provided for controlling the extension of the piston rod 46 so as for selectively pivoting the feed transfer means upwardly and downwardly as indicated by the arrows A (FIG. 1).

Figure 3:
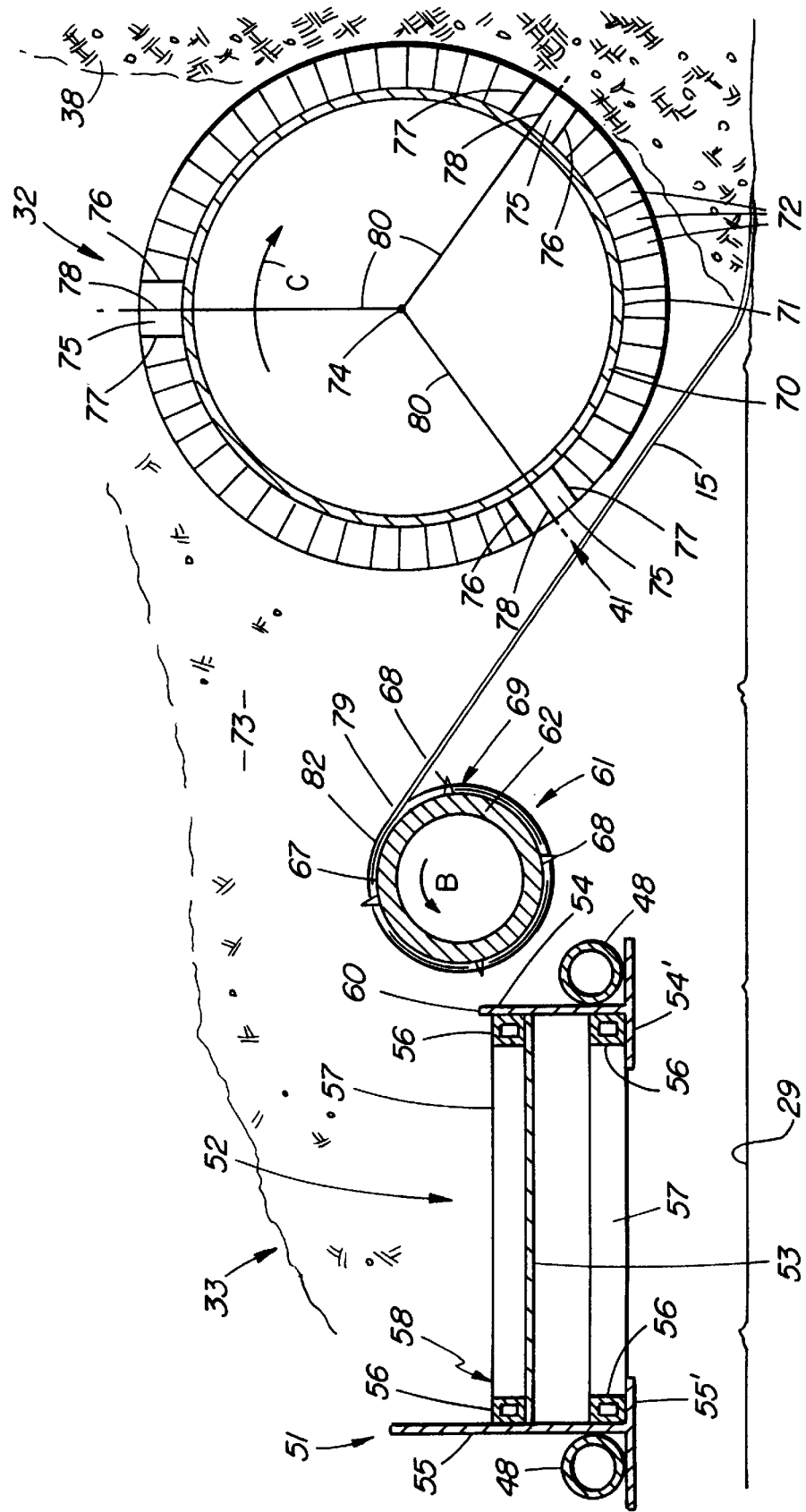
FIG. 3 is a cross sectional view through the feed transfer means, the feed collecting and transporting means, and the advancing means of the apparatus as seen from line 3—3 of Figure; but with the cylindrical member of the feed transfer means in a lowermost position.

As can be seen from the embodiment of the invention illustrated in FIGS. 1 and 3, there are provided lower transverse frame members 48 connected between lower beam members 20,20 of the main side components 17 and 18. Diagonally and downwardly extending bracer members 50,50 are connected between upright columns 25,25 and the rearmost transverse frame member 48. A portion of the conveyor system 33 in the form of a feed collecting means 51 is located between the frame member 48,48, and extends substantially the width of the framework 11. As is apparent from FIGS. 1 and 3, the feed collecting means 51 of the embodiment of the invention illustrated in these figures is in the form of a horizontally extending open top trough member 52 extending between main side components 17 and 18, the trough member being made up of a horizontal flat bottom 53 formed integrally with a front side member 54 and a rear side member 55. The front and rear side members 54,55 extend below the bottom 53 and at the lower edges thereof there are provided inturned flange portions 54',55'. The feed collecting means 51 of the conveyor system 33 includes a driven conveyor shown in the embodiment of FIG. 1 as a chain type drag conveyor 58 having a pair of sprocket driven side chains 56,56 connected at spaced intervals by cross bars 57. The top flight of the conveyor 58 drags along a top surface of the bottom 53, traveling from left to right as seen in FIG. 1, and a bottom, return flight of the conveyor (FIG. 3), slides beneath the bottom 53 on inturned flange portions 54',55'. The conveyor 58 could alternatively be in the form of a continuous flexible belt instead of a chain type conveyor. An upper portion of front side member 54, which is shorter than the rear side member 55 of trough member 52, defines an upper forward edge 60 of the feed collecting means 51.

Located immediately forward of the front side member 54 of the feed collecting means 51 is an advancing means 61 utilized to draw the apparatus 10 towards the compacted feed 38 exposed at the open end of the storage bag 13. The advancing means 61 of the embodiment shown in FIGS. 1 and 3 is in the form of a lower roller means 69 provided by an elongated cylindrical roller 62 having opposed shafts 63,64 projecting from opposite ends thereof and journalled in bearings 65,65 affixed to an upper surface of the horizontal lower beam member 20 of the opposite main side components 17,18 forming the framework 11. The roller 62 therefore extends substantially the full width of the framework, and is provided with drive means 66, which will be described in more detail below, for rotating the roller 62 about its axis which extends transversely relative to the travel of the apparatus in the direction of the longitudinal central axis 14 of the bag 13. The roller 62 defines a cylindrical outer surface 67 (FIG. 3) which is preferably provided with a plurality of sharp projections 68 spaced about the circumference and along the length of the roller. The roller 62 is carried by the framework 11 above the ground, and it is so positioned that its upper peripheral surface is forward of the upper forward edge 60 of the front side member of the trough 52, as is most apparent from FIG. 3. The upper peripheral surface of the roller 62 is at a level at least as high as the upper forward edge 60.

Prior to commencement of the unloading of the bag 13, and once the slits S have been first formed so as to form the separate lower portion 15 and upper portion 16 of the sheet material of the bag, the free end of the lower portion 15 is snagged on the projections 68 so that when the roller 62 is then initially driven to rotate in the direction of the arrow B (FIG. 3), the lower portion 15 starts to form a roll 82 of the plastic sheet material on the lower roller means 69. In view of the position of the roller 62 above ground surface 71, it can be seen that the lower portion 15 of the sheet material is effectively raised from the ground surface as it passes over the top of the roll in the process of being wound on the roller 62. Also as the lower portion 15 is pulled upwardly to the raised position it is adjacent the upper forward edge 60 of the feed collecting means 51. The feed which has been fragmented and pushed rearwardly by feed transfer means 32 so as to rest on the lower portion 15 of the sheet material being raised by the roller 61 tumbles into feed collecting means 51 as the roller 62 is rotated. Moreover, as will be described in more detail below, as the turning of the roller 61 in the direction of the arrow B continues, the lower portion 15 of the flexible sheet material, on which the compacted feed rests, is pulled taut to the extent that the winding up of the lower portion 15 provides a pull resulting in a drawing force on the apparatus 10 towards the exposed end of the compacted feed. Further description is set out below of the manner in which the advancing means is selectively operated to advance the apparatus 10 while it at the same time functions to store the plastic sheet material of the bag 13 as it is emptied. It may be desirable, particularly in the situation where the feed is of the type containing high moisture grain, to locate the roller 62 at a higher level and more rearwardly over the edge 60 of the trough member.

Figure 4:
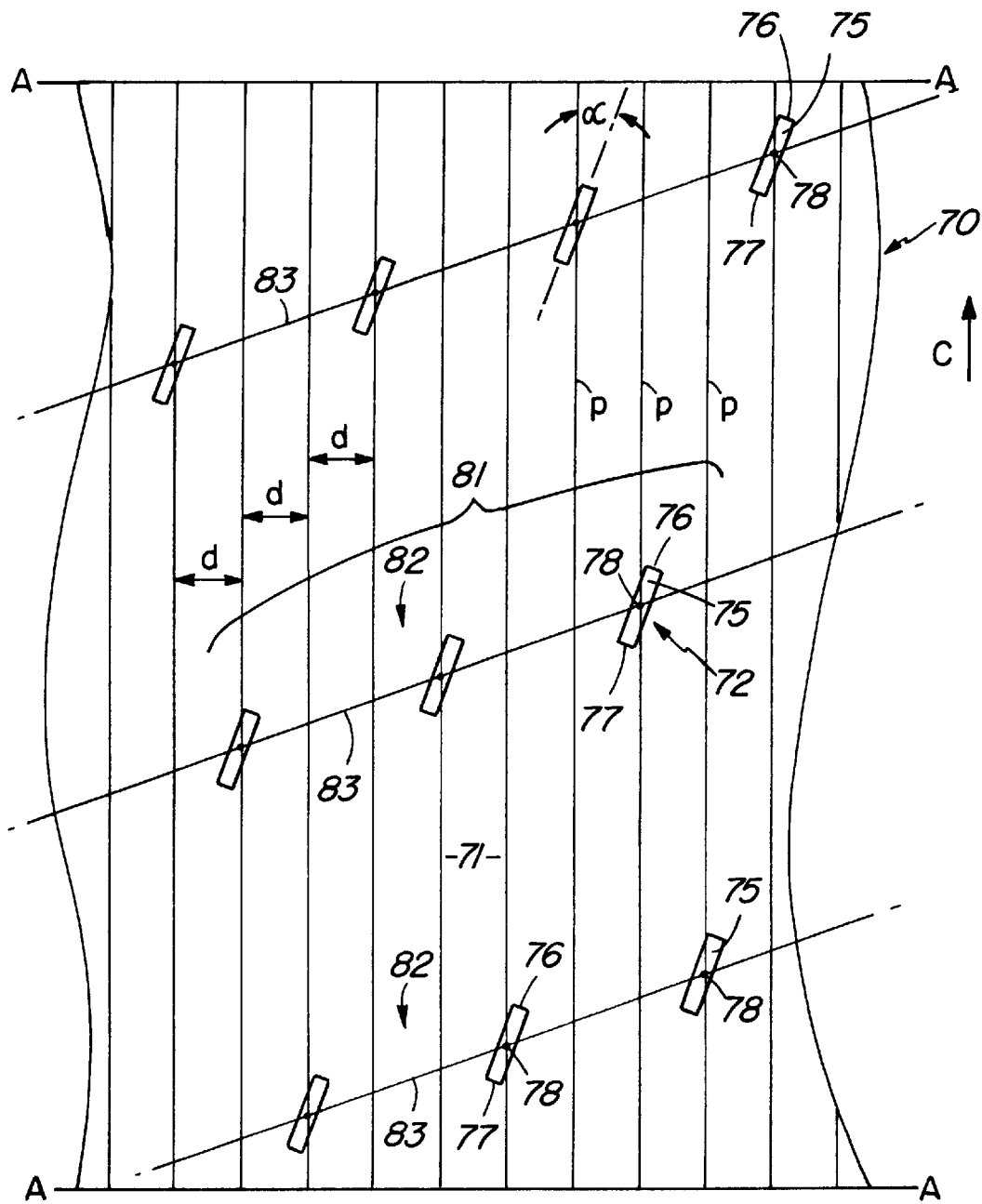
FIG. 4 is a view looking at the outer surface of a drum means forming part of the feed transfer means but developed to a flat condition so as to illustrate an arrangement of blades thereon.

The cylindrical member 41 of the feed transfer means 32 includes an elongated drum 70 defining a cylindrical outer surface 71, from which a multiplicity of projections 72 extend for engaging the compacted feed 38 on rotation of the drum about a transverse axes 74 in the direction of arrow C (FIGS. 3 & 4). Contact of the projections 72 with the compacted feed 38 fragments the compacted feed thus forming loose comminuted feed 73. The projections 72 are preferably in the form of a plurality of blades provided by plate members 75, each affixed at an inner end to the cylindrical outer surface 71 of the drum 70. Each plate member 75 is of a generally rectangular shape, with the exception that the inner end is of a curvature substantially matching the curvature of the outer surface 71. The plate members thus define substantially parallel leading edge 76 and trailing edge 77 when considered in the direction of rotation C of the drum 70. Each plate member 75 has a central axis 78 thereof disposed or aligned on a radial line 80 projecting from the central axis 74 of the drum 70. The plate members 75 are spaced from each other in a substantially parallel relationship. As is most apparent from FIG. 4, the blades or plate members 75 can be considered to be arranged in sets 81 of blades, there being shown three such sets wherein each set consists of a plurality of plate members 75 disposed on an imaginary line 83 extending longitudinal substantially along the full length of the drum. Preferably, the lines 83, which are equally spaced at 120 degrees, spiral about the drum 70. The central axis 78 of each plate member is disposed in a transverse plane p normal to the central axis 74 of the drum 70, the planes p being axially spaced a set distance d. The transverse plane p containing the central axis of a blade in one set is thus spaced a distance d from the plane of a blade of the consecutive set taken in the direction of rotation so that the leading edge of each blade defines a circumferential cut as the drum rotates which is separate from the cuts of all other blades on the drum. It is further preferable that at least some of the blade members 75 be turned at a slight angle α about their central axis relative to the central plane p thereof (FIG. 4). The plate members 75 between a mid point of the drum and one end of the drum are turned through the angle α in an opposite direction to that of the plate members 75 between the midpoint and the opposite end of the drum.

In operation, the side arms 34 are first raised by elevating means 44 so that the drum 70 is higher than the top of the compacted feed 38, and the apparatus 10 is advanced a few inches so that the drum is above the compacted feed and beyond the exposed end of the compacted feed. The drum 75, which is then rotating in the direction of the arrow C, is slowly lowered as the arms 34,34 move downwardly through the arc depicted by arrow A (FIG. 2). As the compacted feed 38 is comminuted by the rotating blades, it is directed rearwardly under the descending drum 70, and due to the slight orientation of the blades, the movement of the fragmented feed 73 is slightly inward from the opposite ends of the drum, thus reducing spillage from side edges of the lower portion 15 of the sheet material from the bag 13. The fragmented feed 73 is continually pushed rearwardly as more and more fragmented feed is removed from the exposed rear face of the compacted feed 38. Accordingly, the fragmented feed is pushed rearwardly by the rotating drum sufficiently to continually spill over into trough member 52 of the feed collecting means 51. The fragmented feed 73 falling into the collecting means 51 is continually carried to an area of removal at one end of the trough member 52 by conveyor 58 and then loaded into a wagon or the like as will be more fully described below. Once the drum 70 has reached its lower most position illustrated in FIG. 3, it is then raised to its uppermost position again by elevating means 44, at which time the advancing means 61 is again activated so that on rotation of roller 62, more of the lower portion 15 is rolled onto roller 62 to form a stored roll 79 of the sheet material on the roller 62. Such rolling up of the lower portion 15 of the bag material from under the compacted feed 38 results in a pull force which again moves the apparatus towards the open end of the bag. As such action shortens the distance between the roller 62 and the end face of the compacted feed and at the same time raises the lower portion 15 to the upper peripheral of the roller 62, the fragmented feed remaining on the upper surface of the lower portion 15 tumbles on to the conveyor 58 and is carried away. The advancement of the apparatus again positions the drum 70 for its next downward comminuting stroke.

As the blades or plate members 75 are rotated into engagement with the compacted feed, the blades of more than one set 81 of blades are continually in engagement with the feed which would not be the situation if the lines 83 of the sets of blades did not spiral about the surface of the drum 70. This feature reduces vibration which otherwise could be significant, particularly if the exposed compacted feed 38 is in a frozen condition.

Figure 5:
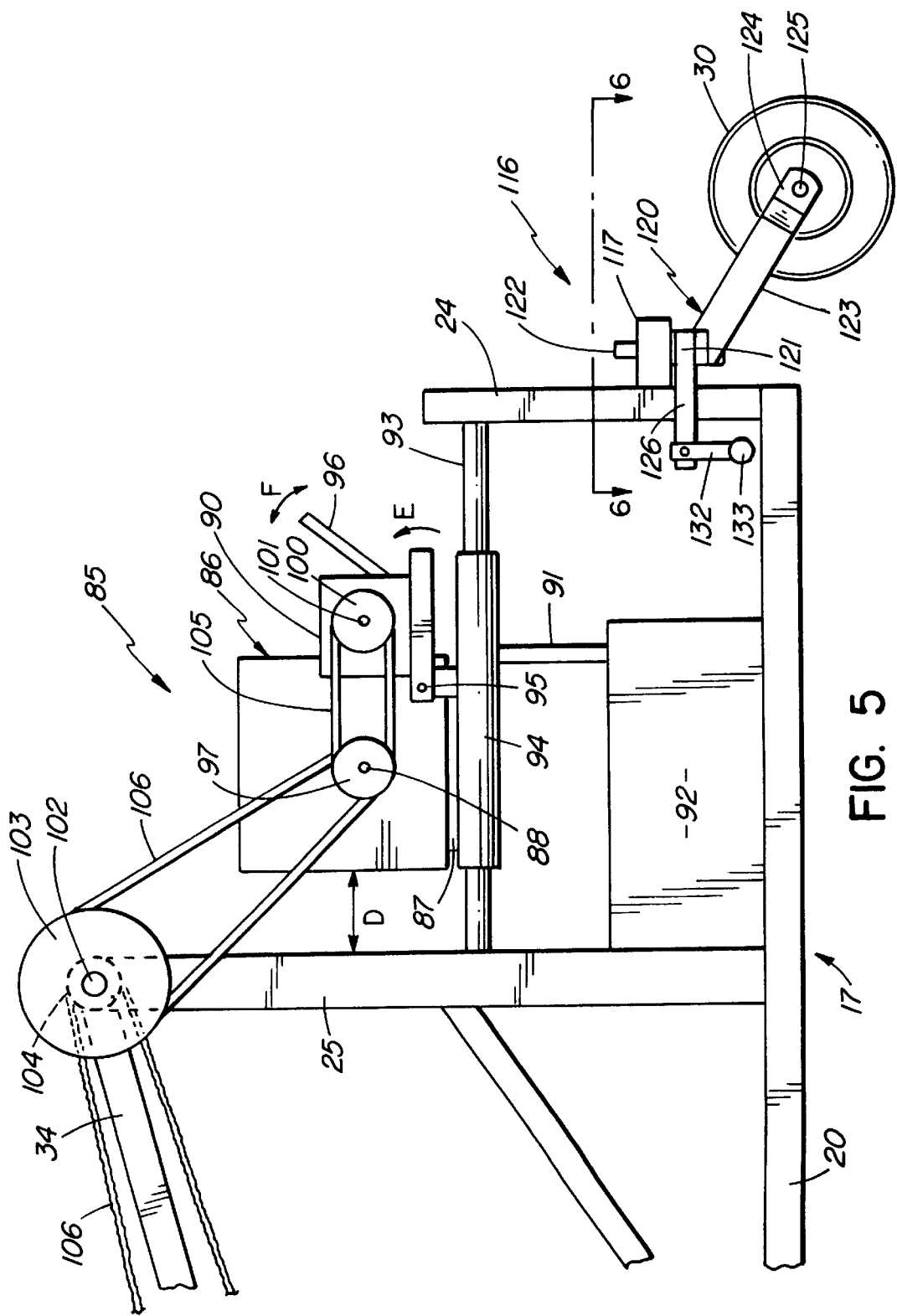
FIG. 5 is a somewhat enlarged elevational view of a rear portion of the apparatus as seen from the left side of FIG. 1.

Referring now to FIG. 5, there is shown a power source 85 which is mounted on the main side component 17 of the framework 11. The power source is shown, by way of an example, as being an internal combustion engine 86 mounted on a subframe 87 having a rotatable output shaft 88. Mounted on the same subframe 87 is a hydraulic pump 90 having a fluid supply line 91 connected to a hydraulic reservoir 92 carried below the subframe 87 on lower beam member 20 of the main side component 17. The subframe 87 is carried on a pair of horizontal supporting members 93 which are mounted between upright column 25 and rear vertical member 24, the subframe 87 including a pair of horizontal tubular members 94 having internal dimensions to closely receive the outer cross-section shape of the horizontal supporting members 93 so that the subframe 87 is free to reciprocate in forward and rearward directions as indicated by the arrow D. The pump 90 is supported on the subframe 87 by a pivot connection 95 so that it can pivot upwardly from a normal operating position as shown to a tilted position as indicated by the curved arrow E. A lever mechanism 96, which is only partially shown in FIG. 5, includes a linkage between a stationary frame part (not shown) and both the subframe 87 and pump 90, so that when the lever 96 is pivoted to a downward position as indicated by the arrow F, the linkage is moved to an over center position to hold the pump in its normal operating position and the subframe 87 in an operative position to the right. However, when the lever is raised, the linkage shifts the engine to the left and the pump to the raised tilted position.

The output shaft 88 of the engine 86 has a multiple groove sheave 97 mounted on it for driving rotation therewith. The pump 90 has a sheave 100 affixed to an input shaft 101 of the pump, the sheave 100 having a groove aligned with one groove of the sheave 97 of the engine 86. Rotatably mounted on one end of the tubular member 35 of the forwardly projecting feed transfer means is a hub means 102 on which are fixed for rotation therewith a sheave 103 and a sprocket 104, a groove of the sheave 103 being aligned with another groove of the sheave 97. One belt 105 drivingly connects sheave 97 of the engine to the sheave 100 of the pump, and a second belt 106 drivingly connects sheave 97 to the sheave 103 for turning sprocket 104.

The drive means 43 of the feed transfer means includes a sprocket 110 affixed to the shaft 42 at the left end of drum 70, as viewed in FIG. 1, and a continuous drive chain 108 encircles sprockets 104 and 105 so as to provide drive for the rotation of the drum 70 of the feed transfer means of the apparatus 10. Because the location of the sprocket 107 is fixed relative to the forward end of the side arm 34, and the swinging movement of the arm is about the axis of the tubular member 35 on which the hub means, which includes the axis of the sprocket 104, is mounted for coaxial rotation relative to the tubular member 35, the continuous drive chain 108 is not affected by the arcuate travel of the drum 70 as it is raised and lowered.

When the lever mechanism 96 is in the position for normal operation, the belts 105 and 106 are maintained taut for driving the drum 70 and the pump 90. However, if it is desirable to remove all load from the engine 86, such as during cold starting of the engine, the lever mechanism 96 can be raised to shift the engine 96 to the right, relative to the framework 11, as viewed in FIG. 5. This action removes the tension on belt 106, and at the same time pivots the pump upward, relative to the engine, whereby the output shaft 88 idles without load. It would be a reasonable alternative to provide a more elaborate clutching means between the engine and the sheaves driven directly from the output shaft 88 of the engine 86, but normal operating experiences encountered by the apparatus 10 may not warrant such a more elaborate mechanism than that which has been illustrated. As will be described in relation to another embodiment of the invention, the engine 86 may be adapted to drive a hydraulic pump whereby all components of the apparatus are driven through hydraulic motors.

As will be described further below, situated behind the power source 87 as shown in FIG. 5, there is provided an operator's station (not shown), which includes, in addition to the lever mechanism 96, control means for the engine 86 and flow control valves for manually controlling the flow of pressurized fluid to the various motor units utilized in the necessary drive systems of the apparatus 10. As described above, the drum 70 is driven in the illustrated embodiment of the invention through belt 106 and continuous chain 106. An alternative system which can be used in the present embodiment of the invention could include a hydrostatic motor drivingly connected to shaft 43 either directly or through a drive chain. In such an arrangement, which is described in a later embodiment, a flow control valve is provided at the operator's station for controlling the flow to such motor so as to allow the operator to start and stop the rotation of drum 70 or to vary its speed. There is provided a control valve (not shown) for controlling the flow via a fluid line (not shown) to a hydraulic motor shown at 111 in FIGS. 1 and 9 as mounted on lower beam member 20 of the main side beam member 17. The shaft 63 of the roller 62 projects through bearing 65 affixed the beam member 20 and has a sprocket 112 affixed thereto. A continuous chain 113 connects sprocket 112 and a sprocket 114 driven by an output shaft of motor 111. Thus, as advancement of the apparatus 10 forward towards the exposed face of the compacted feed is required, the appropriate control valve is activated to cause the flow of pressurized hydraulic fluid to the motor 111 for a short period of time so as to rotate the roller 62 and thus draw the apparatus forward a short distance. This operation at the same time further stores the lower portion of the sheet material of the bag 13 on the roll 82.

It will be appreciated that instead of providing the apparatus 10 with its self-contained engine 86, it could be provided with a shaft for removable connection to a PTO shaft of a tractor, and also pressurized fluid could be supplied to the various hydraulic drive systems of the apparatus 10 by way of connections of the valving at the operator's station to the hydraulic system of the tractor.

Figure 6:
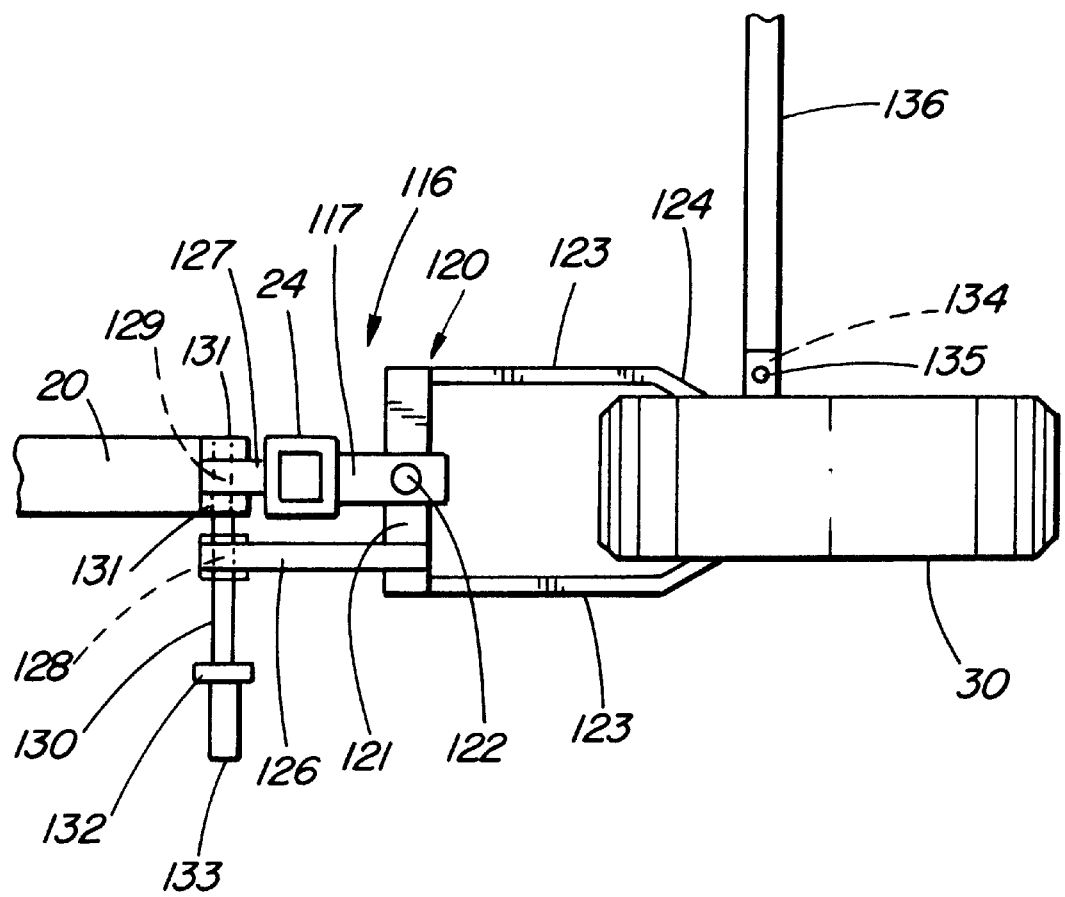
FIG. 6 is an enlarged sectional view as seen from the line 6—6, of FIG. 5.

As indicated above, the apparatus 10 includes features which allow control of the steer of the framework 11 so as to properly track the apparatus 10 to closely follow the central axis 14 of the bag 15. Referring to FIGS. 5 and 6, it is to be noted that the left rear wheel supports the rear vertical member 24 of the main side component 17 by way of a swivel type mounting means 116. A rearwardly extending projection 117 is rigidly affixed to a rear face of the member 24 at a level higher than lower beam member 20. A mounting member 120 of the wheel includes a horizontal load bearing member 121 which engages a bottom surface of the projection 117 and has affixed to its upper surface a vertical king pin or spindle 122 received for rotational movement in a vertically extending opening through the projection 117. At opposite ends of the member 117 there are provided opposed strap members 123, 123 which extend downwardly and rearwardly. The lower end portions 124 of strap members 123, 123 curve inward towards each other and carry therebetween an axle 125 of the wheel 30. Affixed to an outside end of the load bearing member 121 and extending forwardly past the vertical frame member 24 is a steering arm 126 having at its forward end a threaded opening 128 therethrough. A forwardly extending projection 127 is affixed to a forward face of the vertical member 24 and has an opening 129 in alignment with the threaded opening through the forward end of steering arm 126. A threaded rod 130 is received through the threaded opening 128 of the steering arm 126 and has an inner end passing through the opening 129 in the projection 127. At its inside end, the rod 130 has a pair of abutment members 131,131 affixed thereto so as to prevent its endwise movement in either direction as the threaded rod 130 is rotated. At the outer end of the threaded 130 rod, there is affixed thereto a crank arm 132 which extends perpendicular to the rod and is provided with a crank handle 133 at the outer end of the crank arm 133 so as to provide the crank means. As the crank means is rotated, the threaded rod 130 is screwed through the threaded opening 128 in the steering arm 126, and because the threaded rod 130 cannot move endwise due to abutment members 131,131, the steering arm 126 is caused to travel along the threaded rod 130 in either direction, depending on the direction of rotation of the crank means. This movement of the steering arm 126 forces turning of the mounting member 120 about the spindle 122, thus imparting a steer of the wheel 30 in either direction, again depending on the direction of rotation of the crank means.

Affixed to the lower end portion 124 of the strap member 123 which is at the inside of the wheel 30 is a lug 134. The lug 134 has fastened to an upper side thereof an upwardly projection pin 135 which is pivotally received in an opening in an end of a tie rod 136 extending between the wheels 30 and 31.

Figure 7:
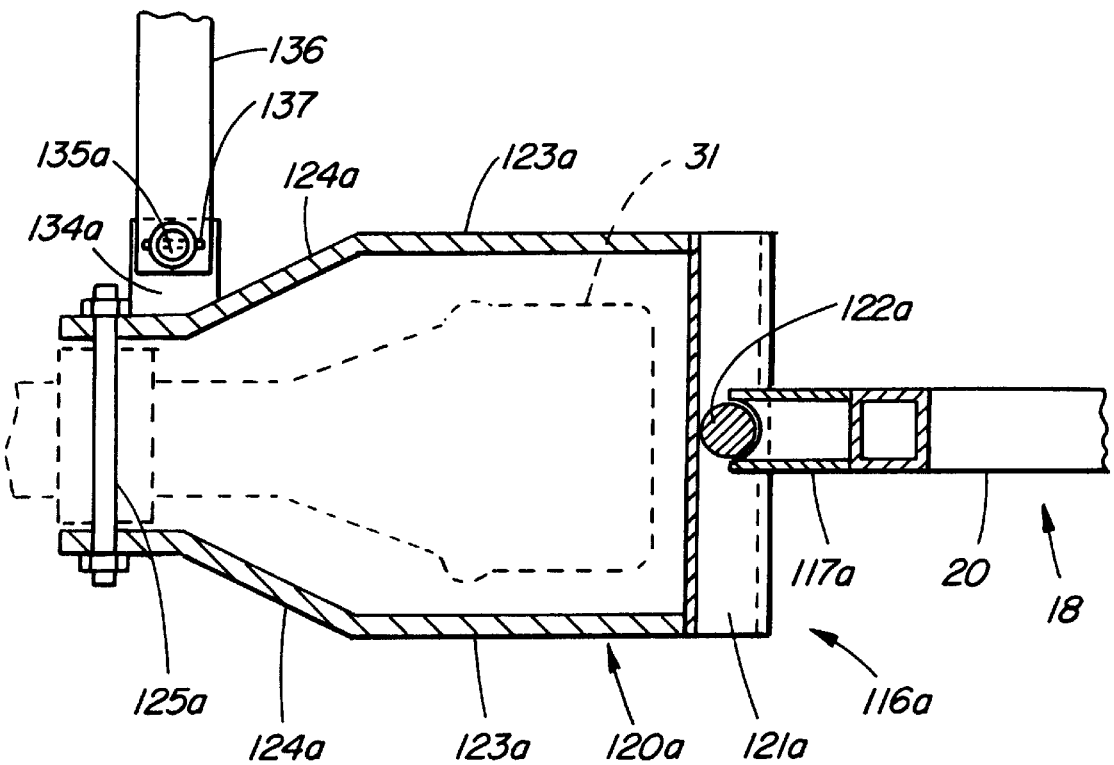
FIG. 7 is an enlarged sectional view illustrating the mounting of the rear wheel at the right side of the apparatus as viewed from the line 7—7, and with the wheel shown in outline for sake of clarity.

A similar swivel mounting means 116*a* is provided for wheel 31 at the right rear of the apparatus 10 as shown in FIG. 7. However, the mounting member 120*a* for this wheel is not provided with a steering arm corresponding to steering arm 126 of the mounting member 120 of wheel 30. The mounting member 120*a* does include, a lug 134*a* on the strap member 123 which is on the inside of the wheel 31, and the lug 134*a*, like lug 134, has an upwardly projecting pin 135*a* for reception in an opening in the end of the tie rod 136 opposite to the end connected to lug 134. The opening at both ends of the tie rod are preferable of the ball type which permit the tie rod to swivel about its longitudinal axis. The upper end of the pin 135*a* has a diametrical opening therethrough for the reception of a removable snap pin 137.

Thus, for reason explained below, by quickly removing the snap pin 137, the right end of the tie rod 136 can be disconnected from the pin 135*a* so as to permit free swivel of the wheel 31 about the axis of the vertical spindle 122*a*. The pin 135 of the mounting member 120 of wheel 30 is preferably also provided with a like snap pin arrangement in order that the tie rod 136 can be removed entirely from its normal location connecting mounting member 120,120*a*.

Figure 8:
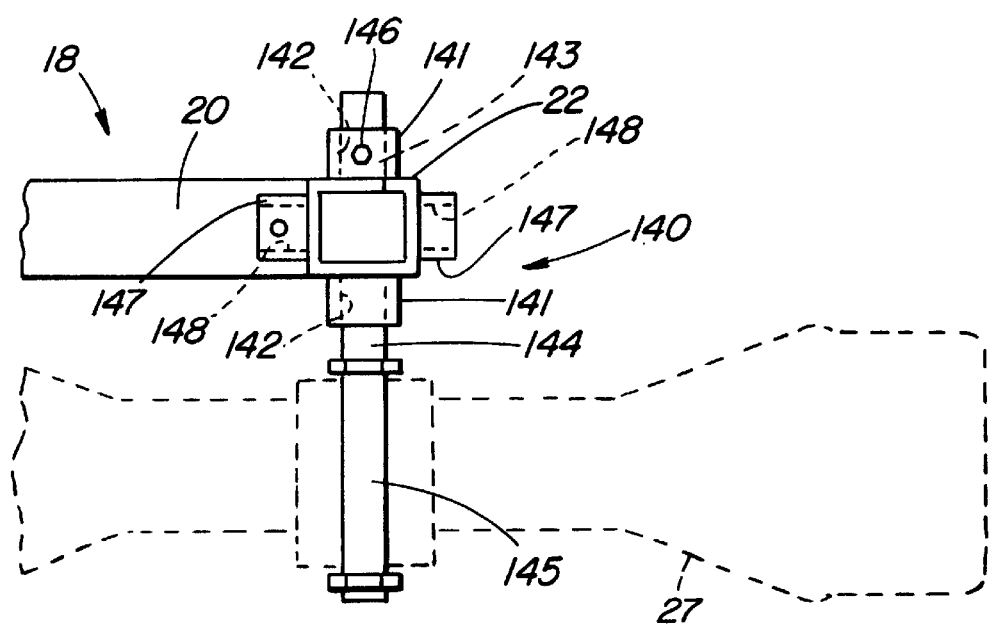
FIG. 8 is an enlarged sectional view illustrating a mounting feature of the front right wheel of the apparatus as seen from line 8—8 in FIG. 12, but showing the wheel in outline for the sake of clarity.

While wheel 26 at the left front of the apparatus 10 may be attached to the main side component 17 of the framework 11 by way of a permanently connected axle providing the axis of rotation of the wheel extending in a transverse direction, wheel 27 at the front right corner is preferably mounted on axle means 140 (FIG. 8) which can be relocated to permit mounting of said wheel for rotation about an axis perpendicular to the transverse axis of normal travel during operation of the apparatus 10. The vertical member 22 at the front is provided with aligned bosses 141 on opposite sides and through which transverse openings 142 extend for reception of an inner end 143 of a transversely extending axle member 144. The wheel 27 is mounted for rotation on an outer end 145 of the axle member 144. A pin 146 passes through aligned bores to one of the bosses 144 and axle member 144 for retaining the axle fixed in place, thereby allowing the wheel 27 to rotate about a transversely extending axis during normal use. For reasons which will be discussed further below, under certain conditions, it may be desired to mount the wheel for rotation about an axis which is perpendicular to the transverse axis, and accordingly, the vertical member 22 includes bosses 147, 147 on its front and rear surfaces below transverse openings 142, and through which openings 148,148 extend for the alternative reception of the inner end 143 of the axle member 144 at right angles to its normal orientation. Thus, the wheel 27 can be switched to a position mounted on the axle means providing an axis extending in the longitudinal direction of the beam member 20.

Referring again to FIG. 1, it may be noted that there is provided a rigid tongue 150 affixed to and projecting perpendicularly from the lower beam member 20 of the left hand main side component 17 of the framework 11. When it becomes desirable to move the entire apparatus 10 from one site to another, the tie rod 136 can be removed in the manner discussed above and placed elsewhere on the apparatus, such as on the trough member 52 of the conveyor system 33 for carrying it with the apparatus as it is moved. The wheel 27 can be repositioned, by withdrawing pin 135, pulling the axle member 144 from openings 142,142, replacing the axle member 144 in opening 148,148 and replacing pin 135 in the opening provided in the rear boss of the bosses 147. A tractor not shown, can then be connected to the tongue 150, and the hydraulic system of the tractor used to raise the side component 17 sufficient to cause wheels 26 and 30 to clear the ground. As the apparatus is then pulled sideways by the tongue 150, the wheel 27 is free to rotate about its axis provided by the repositioned axle member 144, and wheel 31 is free to swivel to a trailing mode. At a new site the apparatus is pulled to a position where the front part 12 faces the end of a new bag 13. The tie rod 136 is then replaced, and the axle member 144 is returned to its normal position so that the apparatus is ready for advancement toward an opened end of a fresh bag 13. The advancement is achieved by slitting either side of the bag material, as shown at S, and the lower portion 15 of the sheet material thus formed is placed over roller 62 in a manner to cause the projections 68 to penetrate the sheet plastic. As the controls are operated to start the motor 111 so as to rotate the roller 62, the formation of the roll 82 is started. Continued rotation causes the lower portion 15 of the sheet material to become sufficiently taut to draw the apparatus to a position where normal unloading of the bag is commenced and carried out as explained above.

Figure 9:
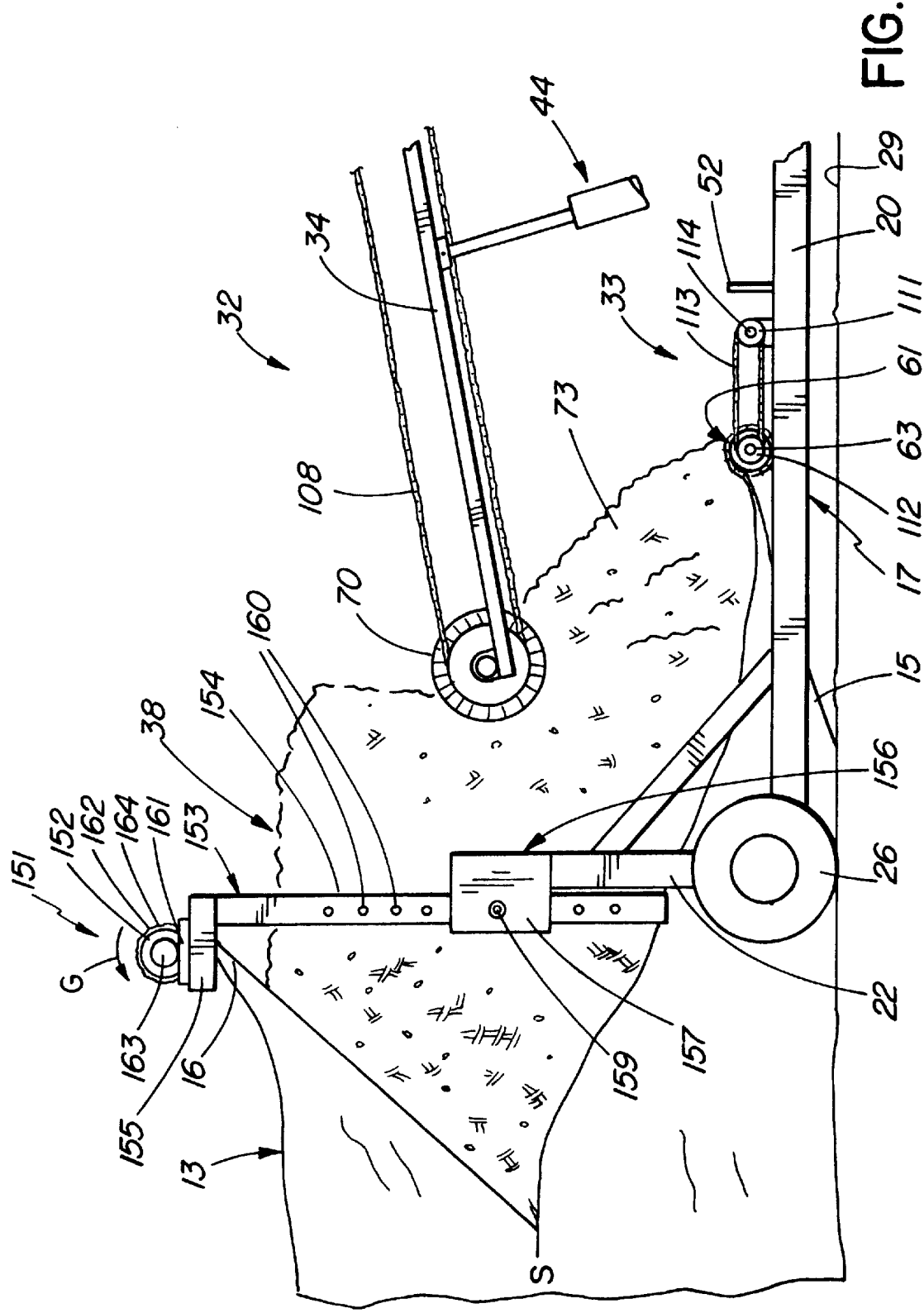
FIG. 9 is an elevational view of a front side portion of the apparatus, as seen from the left hand side and showing in use an alternative embodiment of the invention.

As illustrated in FIG. 9, the feed transfer means 32, the conveyor system 33 and even the advancing means 61 for the apparatus, shown in FIG. 1 are the same as previously described. However, this alternative embodiment includes a sheet material storage means 151 for collecting the upper portion 16 of the sheet material forming the bag above the pair of side slits S. The storage means 151 is in the form of an upper roller 152, which is carried by an elevated frame portion 153, and extends in the transverse direction of the apparatus 10 having a length substantially equal to the width of the framework of the apparatus. The elevated frame portion 153 includes a pair of vertical posts 154 each having a horizontal support member 155 affixed at a rear end to the post 154 and extending forwardly therefrom. A lower portion of each post is received in a bracket 156 formed integral with an upper end of the post 22 of each of the main side components 17,18. Each bracket 156 forms a forward rigid sleeve portion 157 having an internal vertical passage shaped to slidingly receive the lower portion of the post 154.

The posts 154 have a plurality of transverse openings 160 spaced along the length of their lower portions, and a transverse opening is provided through the sleeve portion of the fixed bracket 156 and is positioned to align with one of the openings 160 so that by way of the alignment of a particular one of the openings 160 with the opening in the sleeve portion and inserting a pin 159 through the aligned opening at the post and the bracket, a selected height of the support member 155 is maintained.

A bearing member 161 is carried on top of each of the horizontal support members 155 above each side of the framework 11 at the forward end thereof and the upper roller 152, which may be similar in construction to that of lower roller 62 and is provided with projections, is rotatably supported between the bearings 161. In the embodiment shown in FIG. 9, a shaft (not shown) affixed to the end of roller 152 extends through the bearing 161, and a hydraulic motor 163 is attached thereto for rotating the roller 152 as indicated by the arrow G, when pressurized fluid is provided through a hydraulic line (not shown) as the operator activates a control valve at the operator's station.

Accordingly, when the apparatus 10 is moved into position facing the end of a bag 13, and the slits S are made at either side of the bag, in addition to attaching the lower portion 15 of the sheet material forming the bottom of the bag beneath the compacted feed 38 to the lower roller 62 of the advancing means 61, the upper portion 16 of the sheet material is taken to the upper roller 152 and snagged on projections of the type described in relation to lower roller 62. Thus, as motor 163 is activated, the upper portion 16 commences to wind up on the roller 62 to thereby start the formation of a stored roll 164. Whenever the apparatus is advanced by the operator activating motor 111, the motor 163 is also operated to collect the upper portion 16 of the sheet material by way of the sheet material storage means 151. The setting of the height of the upper roller 162 can be changed to accommodate different sized bags, and if the machine is designed to place the storage means closer to the conveyor system 33, for example, it may be raised during operation to be positioned above the feed transfer means 32 in its uppermost position. When not in operation, the elevating frame portion can be adjusted to lower the roller so that the upper portion 16 is held tightly on top of the compacted feed 38.

Figure 10:
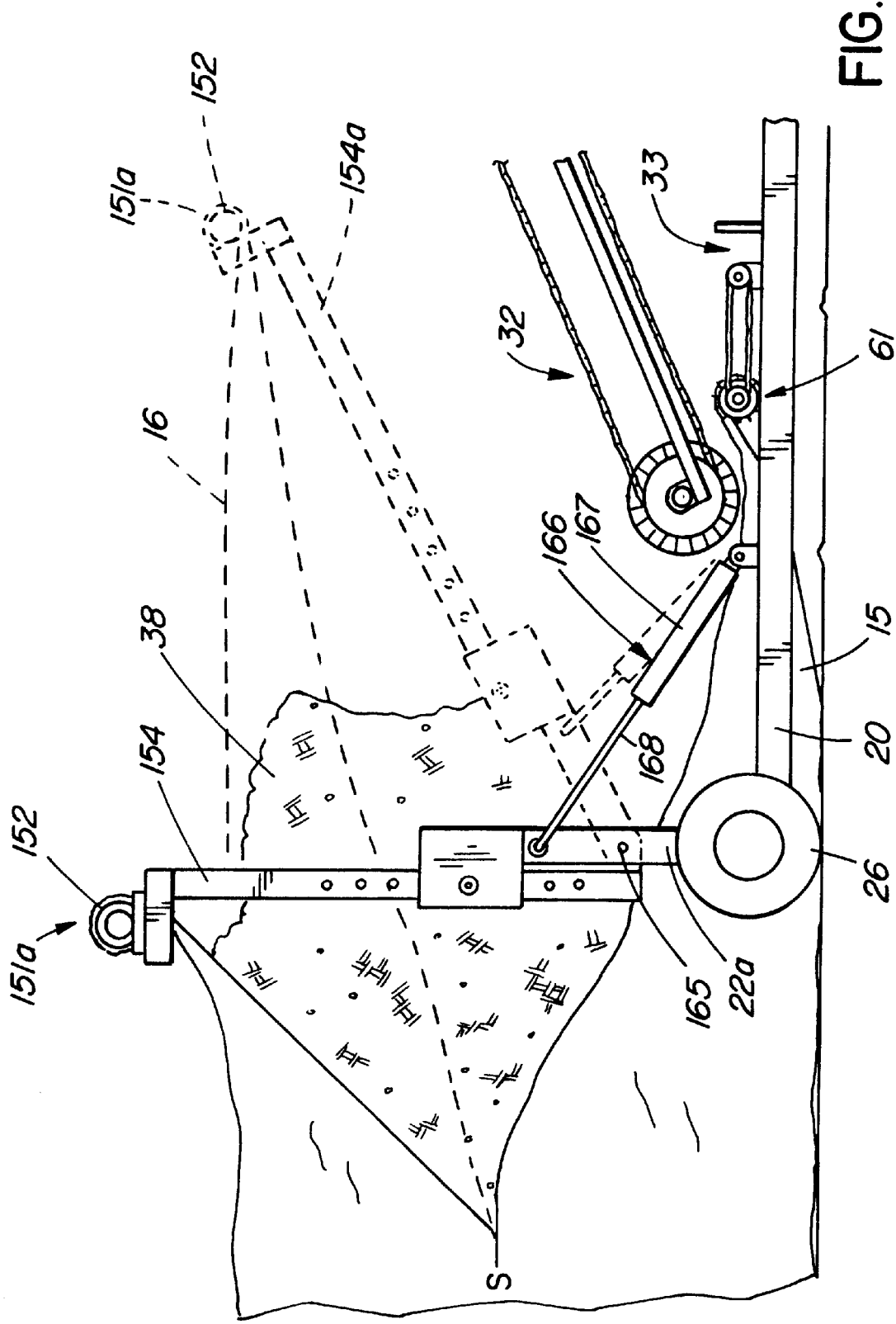
FIG. 10 is a view similar to FIG. 9, but showing a yet further alternative form of the present invention.

In the embodiment shown in FIG. 10, the sheet material storage means 151a is of substantially the same structure as that shown in FIG. 9, except it has been modified to enable it to be moved to an inoperative position in which it holds the upper portion 16 of the sheet material in an extended position over the feed transfer means 32 and the conveyor system 33. In this extended idle condition the storage means 151a not only protects parts of the apparatus from the weather but prevents the exposed end of the compacted feed 38 and the already loose fragmented feed 73 remaining in front of the apparatus and on the feed collecting means 51 from becoming wet and/or covered with snow or ice. In this embodiment, the post 22a is formed of two parts connected by a transverse pivot shaft 165. Piston and cylinder type extendable motors 166 are provided at opposite sides of the apparatus for moving the storage means 151a from its upright operative position. A cylinder 167 of each motor 166 is pivotally connected at its lower end to the lower beam 20 of the main side component 17,18, and an upper end of a piston rod 167 is pivotally connected to the post 22a above the pivot. In the extended condition of the motors 166, the posts 154 of the storage means 151a are held in their upright operative conditions. However, as the motors 166 are contracted, the posts are swung rearwardly due to pivoting action about pivot shaft 165 so that the roller 152 is swung rearwardly to a rearward position, thereby pulling the upper portion 16 of the sheet material over the end of the compacted feed, the already loosened fragmented feed 73, the feed transfer means 32 and the feed collecting means 51 of the conveyor system 33.

As described above, the fragmented feed falling into the collecting means 51 is continuously moved to the right hand end of the trough member 52 which is the area of removal in the presently described embodiment. It is preferable to provide a conveyor extension as part of the conveyor system to continuously move the feed from this area to one for further cartage of the feed from the site of the bag. In the structure shown in FIGS. 1 and 2 the conveyor system 33 includes an upwardly extended trough section 170 which is contiguous with the trough member 52 so that the conveyor 58 passes under a sprocket (not shown) at the juncture of the trough member 52 and is drawn up to the raised upper end of the section 170 where it passes around an upper drive sprocket which is rotated by way of a hydraulic motor 171. As in the case of other hydraulic motors of the apparatus 10, the operation of motor 171 is controlled by way of a control valve at the operator's station. The lower end of trough section 170 is mounted at the end of trough member 52 to pivot about an axis which is coaxially disposed about a shaft rotatable mounting the sprockets at the juncture, and thus the height of the upper end of the trough section 170 can be varied by selection of the length of chains 172,172 which extend between a bracket 173 attached to the trough section 170. The chains 172, 172 have outer ends thereof attached to front vertical member 22 and upright column 25 of the main side component 22. The height of the upper end of trough section 170 would be selected, for example to raise the fragmented feed sufficiently to fall freely into a feed wagon or the like.

An alternative conveyor extension arrangement may be desirable for use when there are a number of storage bags 13 arranged side-by-side in close parallel relationship. With this type of placement of the bags, there may not be sufficient room between the bag being emptied and its neighbour bag to the right, as viewed in FIG. 1, to place a wagon to be filled under the raised outer end of the conveyor extension. In such an alternative arrangement the upperward inclined trough at the removal end of the trough member 52 may be relatively short so that its upper end is only a few feet above the ground surface. The overall conveyor extension could then additionally include a commonly used agricultural elevator of the type which is mounted on a pair of wheels and is provide with a hitch at its forward lower end. The framework 11 would then include a draw bar (not shown) rigidly affixed to and extending perpendicularly from the side of horizontal lower bean member 20 of the main side component 18 of the framework 11. The outer end of the draw bar would include means of providing a swivel connection between the draw bar and the hitch of the elevator, and the draw bar would be of sufficient length and appropriately located along the beam member 20 so that an intake of the elevator is located under the raised outer end of the short upwardly inclined extension from the trough member 52. With this connection, the elevator is drawn in the direction of the normal operational travel of the apparatus 10. The elevator would thus be oriented to have its upper end behind and to the right hand side of the apparatus where a wagon could be conveniently located without interfering with the next bag to the right of the one being emptied. Because of the swivel connection between the hitch of the elevator and the rigid draw bar of the apparatus 10, when the apparatus is drawn to the left during movement to another site, the elevator can turn to a travel position and then follow freely behind the apparatus 10 when it is being towed in that direction. When the elevator is of the type having a hydraulic drive motor at its upper end, it is possible to connect hydraulic lines leading to this drive motor in series with the hydraulic motor provided for driving the conveyor 58 so that the operations of both systems are synchronized from one control valve.

Figure 11:
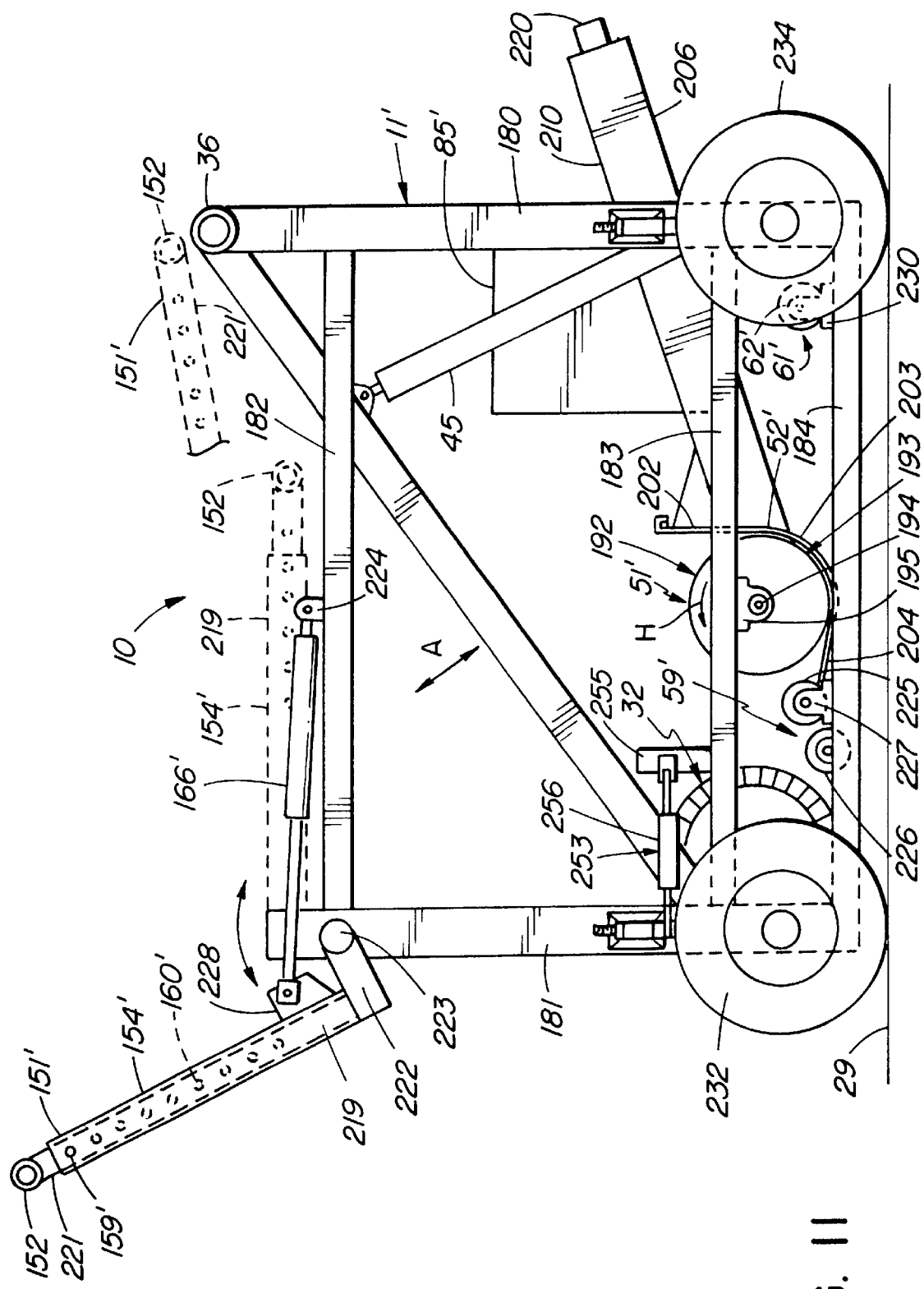
FIG. 11 is a side elevation view as seen from the left hand side of another embodiment of the invention.
Figure 12:
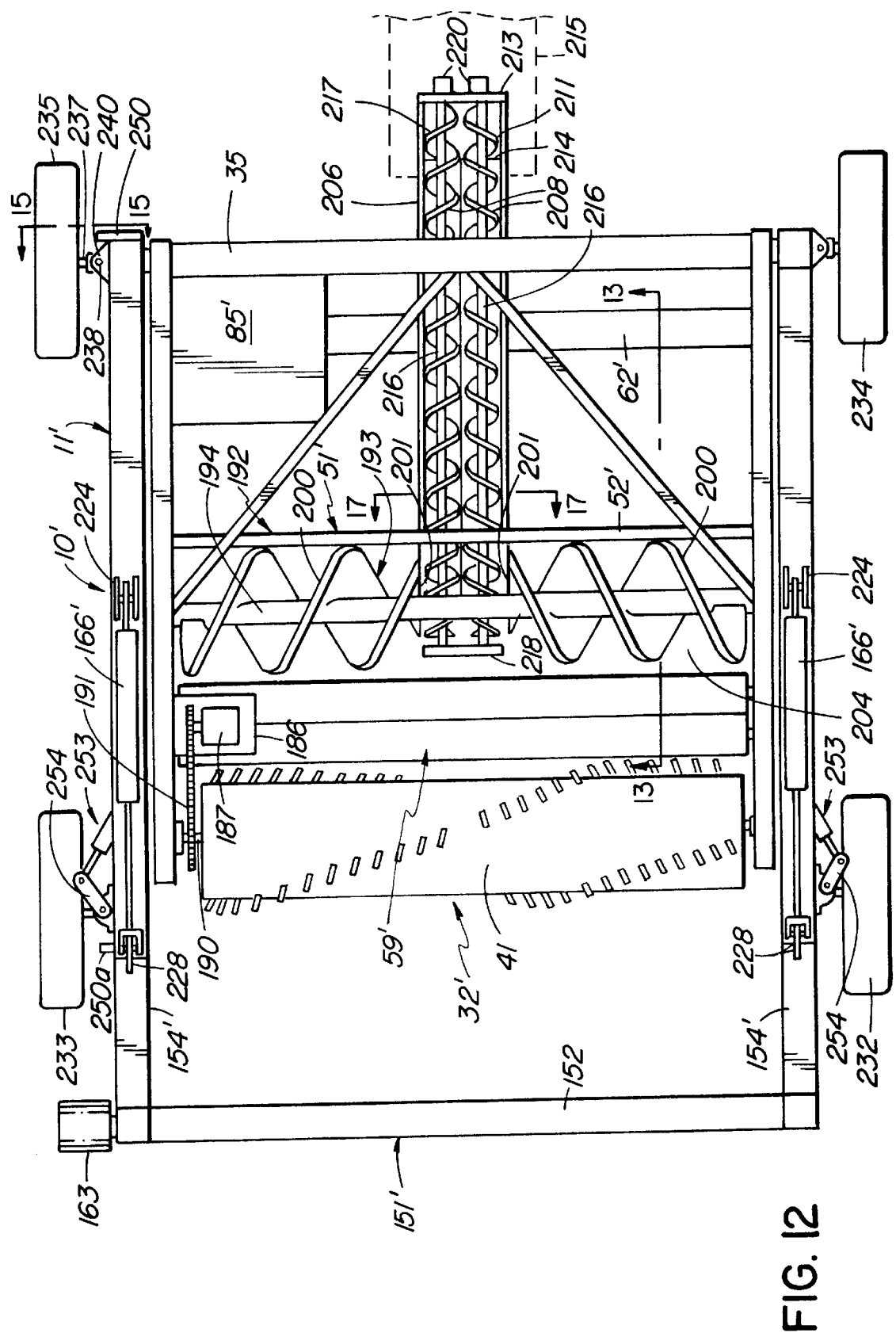
FIG. 12 is a plan view of the embodiment as seen in FIG. 11.

Referring now to the embodiment of the apparatus as shown at 10' in FIGS. 11 and 12, it may be noted that it has a framework 11' of a simpler and more compact construction. The framework 11' has a pair of opposed main side components of similar construction, each including a rear column 180, corresponding to column 25 of the previous embodiment, and a front column 181. An upper horizontal beam 182 joins columns 180 and 181. A pair f lower horizontal beams 183, 184 connect columns 180 and 181 at their lower ends, beam 183 being spaced above but parallel to beam 184 which joins the lower ends of columns 180 and 181.

As in the structure of the earlier embodiments, the apparatus 10' includes a feed transfer means 32', a feed collecting means 51', an advancing means 61', and upper sheet material storage means 151'. As in the earlier embodiments, the advancing means 61' is not only used to draw the apparatus 10' forward during operation, but it also functions as a lower sheet material storage means. In the embodiment now being described, however, there is provided a separate sheet raising means 59' for providing a function also performed in the combination of the elements forming the advancing means 61 in the earlier embodiment.

As illustrated at 85' in FIGS. 11 and 12 a power source is provided at the rear right corner of the apparatus 10', and it may be mounted, for example, on a platform (not shown) to be carried at a level above beam 183. In this embodiment of the invention, it is proposed that the power source 85' be in the form of a self contained internal combustion engine which drives a main hydraulic pump, and further that all driven components of the apparatus 10' be powered by hydraulic motors so that no drive other than that required for the main hydraulic pump, and possibly the usual electrical generating means, be connected to the output of the engine. The controls for the various hydraulic motors may be located at the rear right corner of the apparatus, thus establishing an operator's station at that location.

The overall structure of the feed transfer means 32' is substantially the same as that described above. It includes the previous described cylindrical member 41 rotatably mounted between the front ends of side arms 34,34 which are connected to at their rear ends to the transverse tubular member 35 carried for rotation in bearings 36,36 affixed to the upper ends of columns 180, 180. The feed transfer means 32' is also provided with elevating means in the form of hydraulic cylinder members 45 for moving the cylindrical member 41 through a working arc as again indicated by arrow A. The operation of cylinder members 45 is of course controlled from the above described operator's station. Unlike the previously described embodiment of the invention the cylindrical member 41 of the feed transfer means 32' is not driven through mechanical means directly from the engine forming the power source of the apparatus 10'. As can be seen in FIG. 12 the right hand arm 34 has a small platform 186 mounted on the inside thereof near the front end of the arm, and a hydraulic motor 187 is carried by the platform 186. An output shaft of the motor carries a sprocket which is aligned with a sprocket on an end of a shaft 190 of the cylindrical member 41, whereby the cylindrical member 41 is rotated through a chain drive 191 connecting the sprockets of the motor 187 and of the cylindrical member 41. Again, the operation of the motor 187 may be controlled from the operator's station.

Unlike the chain type drag conveyor 58 forming the feed collecting means 51 of the earlier apparatus 10 of the embodiment, the feed collecting means 51' of the apparatus 10' includes an auger type conveyor 192 which extends between lower horizontal beams 183,184 of the two opposed main side components of the framework 11'. The conveyor 192 includes a rotatable auger component 193 which includes a main central shaft 194 journalled for rotation in bearings 195,195 affixed beneath beam 183 (FIG. 11). As is apparent from FIG. 14, a support member 196 is connected between beams 183 and 184 and carries a hydraulic motor 197 which is attached to the right end of the shaft 194 for rotating the auger component 193 in the direction of the arrow H. The auger component 193 further includes a pair of oppositely spirally wound auger flights 200,200 each commencing from opposite ends of shaft 194 and extending to opposed spaced inner ends 201,201 adjacent the mid point of the conveyor 192 (FIG. 12). The flights 200,200 being oppositely wound results in the feed of both flights, when the auger component is rotated in the direction indicated, being towards the mid point which thus forms an area of removal of collected feed in this embodiment of the invention.

The feed collecting means 51' includes a trough member 52' which also extends the transverse distance between the beams 183,184 of the main side components, thus being substantially the same length as the auger component 193. The cross sectional shape of the trough member 52' is different, however, than that of conveyor 58 of the earlier embodiment. The trough member 52' in cross section has a substantially vertical rear wall 202 having an upper edge extending well above the upper periphery of outer circumferential edges of the flights 200,200. The rear wall merges downwardly into a lower arcuate section 203 which extends downwardly and under the flights 200,200, the radius of the arcuate section 203 being slightly greater than the radius of the circumferential edges of the flights. Towards the front of the auger component the trough member 52' has a forwardly and slightly upward extending portion 204 at substantially a tangent to the arcuate section 203 and terminating at a forward edge 205.

It can be seen that the comminuted feed which is dumped into the trough member 52' in a manner described in more detail below is thus moved towards a mid point or a central area of removal of the trough member 51' by the rotating auger component 193 which thus provides a transport means in the collecting means 51'. In apparatus 10', the feed is then carried away from this area of removal by a rear feed conveyor means which is shown in the form of a second auger type conveyor 206 extending rearwardly and upwardly to a rear end 207 behind the apparatus 10'. The rear feed conveyor 206 is of a type having a pair of side-by-side auger units 208,208 contained in a trough 210, the bottom wall 211 which merges substantially tangentially at its lower end with the lower arcuate section 203 of the trough member 52'. The rear wall 202 and a part of the arcuate section 203 of the trough member 52' are provided with an opening 212 shaped to provide a passage from the interior of the trough member 52' to the inside of the trough 210 of the rear feed means 206.

Figure 17:
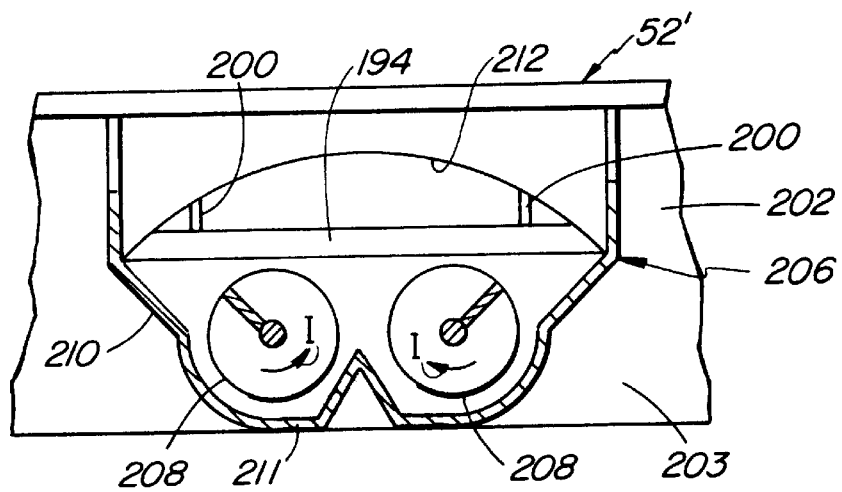
FIG. 17 is an enlarged view as seen from the line 17—17 of FIG. 12 showing a cross-section through a rear feed conveyor.

The auger units 208,208 extend the length of the trough 210, and have lower ends passing into the interior of the transverse trough member 52' beneath the middle portion of the shaft 194 of auger component 193. The trough 210 has a transverse rear end wall 213, and immediately in front of this wall the bottom wall 211 is provided with an opening 214 through which the feed can fall as it approaches the rear end of this rear feed means 206. As will be described further below a lower end of an elevator 215 may be placed to collect the falling feed and transfer it upwardly for dumping into a wagon or the like. The auger units 208,208 are of similar construction, each consisting of a central shaft 216 with a spiral flight 217 affixed thereto, but the flights are wound in opposite directions. The central shafts 216,216 of the two auger units are mounted in parallel fashion with upper ends which are journalled in and pass through the rear end wall 214 of the trough 210 lower ends of shafts 216,216 are journalled in bearing means 218 fixed on the upper surface of forwardly extending portion 204 of the trough 52'. The upper ends of the central shafts 216,216 have drive means 220 for rotating the auger units in opposite directions as indicated by the arrows I,I in FIG. 17. The drive means may be in the form of a pair of hydraulic motors, or a single hydraulic motor with appropriate gearing to have a double output of opposite rotation.

It is believed apparent from FIGS. 11 to 13 and FIG. 17, that as the fragmented feed is dumped into the trough 52' during operation of apparatus 10', the feed is moved transversely to the central area of the trough by the rotation of auger component 192, and from this area it is moved rearwardly and through the opening 212 by the auger units 208,208 the lower ends of which are rotating in opposite directions below the central portion of the central shaft 194. The fragmented feed thus moves up the rear feed means formed by the conveyor 206 falls from the rear end of this conveyor as it reaches the opening 212 in the bottom wall 211. The falling feed may be moved to another site such as by the conveyor 215, one form of which is described further below.

Apparatus 10' is provided with an upper sheet material storage means 151' for collection of the upper portion 16 of the bag material as the feed is removed from bag 13. The upper storage means 151' includes an upper roller 152 supported by posts 154' and having a hydraulic drive motor 162. The structure of the posts 154' and the manner in which they are mounted are somewhat different than what has been previously described, and as a result of the differences the storage means 151' is more versatile in its positioning to accommodate different sized bags and in its ability to provide more complete coverage of the feed and the apparatus when the apparatus is not in use.

Each post 154' includes an outer elongated tubular member 219 which telescopically receives an elongated inner member 221 having bearing means at its outer end for carrying the upper roller 152 as previously described. The outer member 219 is provided at its outer end with a transverse opening for receiving a pin 159'. The inner member 221 includes a plurality of transverse openings 160' along its length and which can be aligned with the opening in the outer member so as to also receive the pin 159' to hold the inner member 221 at a predetermined amount of extension. At an inner end of the outer member 219 there is provided a connecting member 222 extending at right angles thereto and having a pivot connection 223 for fastening the post 154' to the upper end of column 181. A hydraulic cylinder means 166' is pivotally connected at one end to a flange 228 affixed to outer member 219 and at its outer end to a bracket 224 affixed to the top of upper horizontal beam 182. The amount of extension of the hydraulic cylinder means 166' is again controllable from the operator's station, as is the rotation of the roller 152. It can be seen that as the cylinder means 166' is extended the roller 152 is moved upwardly forwardly of the apparatus 10'. The roller 52 is held in a raised position and well out of the path of the feed transfer means 32' as the cylindrical member 41 is raised to its upper position preceding its downward working stroke.

After the operation of filling the necessary feed wagons, or the like, is completed, the cylinder means 166' is fully retracted, which, in effect, moves the storage means 151' to a folded back position, and the upper sheet material on the storage means 151' is pulled back over the apparatus 10. In this position the exposed end of the compacted feed, the feed which has already been fragmented, and also the feed transfer means 32' and the feed collecting means 51' is covered by the upper portion 16 of the bag 13 extending to the stored roll 152. Also by telescoping the inner member 221 outwards to a more extended position the upper portion 16 of the sheet plastic material can be held in a taut position covering the entire apparatus 10' as shown at the upper right of FIG. 11 until the next use of the apparatus is required, at which time the sheet material storage means 151' is returned to its operative position by expanding cylinder 166' and at the same time activating motor 163 to rewind the sheet material which had been providing a cover.

As indicated above, in apparatus 10', the advancing means 61' which is in the form of driven roller 62' positioned near the rear of the apparatus is separate from the sheet raising means 59' positioned in front of feed collecting means 51'. The sheet raising means 59' includes two transversely extending rollers, a first higher roller 225 being immediately in front of the front edge 205 of the trough member 52' and a second roller 226 being in front of and slightly lower than roller 225. Roller 225, which extends the full length of the trough member 52', is mounted for rotation in bearing members 227 affixed to the top of lower beam 184. Roller 226 is also mounted for rotation in bearings carried by lower beams 184 of opposite sides of the apparatus, and it is preferably of about the same length as roller 225, i.e., it extends substantially the full distance between the two opposed main side components of the apparatus. The axis of rotation of roller 225 is located so that the upper periphery of the roller 225 is above the upper surface of the forwardly extending portion 204 of the trough member 52', and preferably the forward edge 205 projects slightly under the rearmost periphery of the roller 225.

Figure 14:
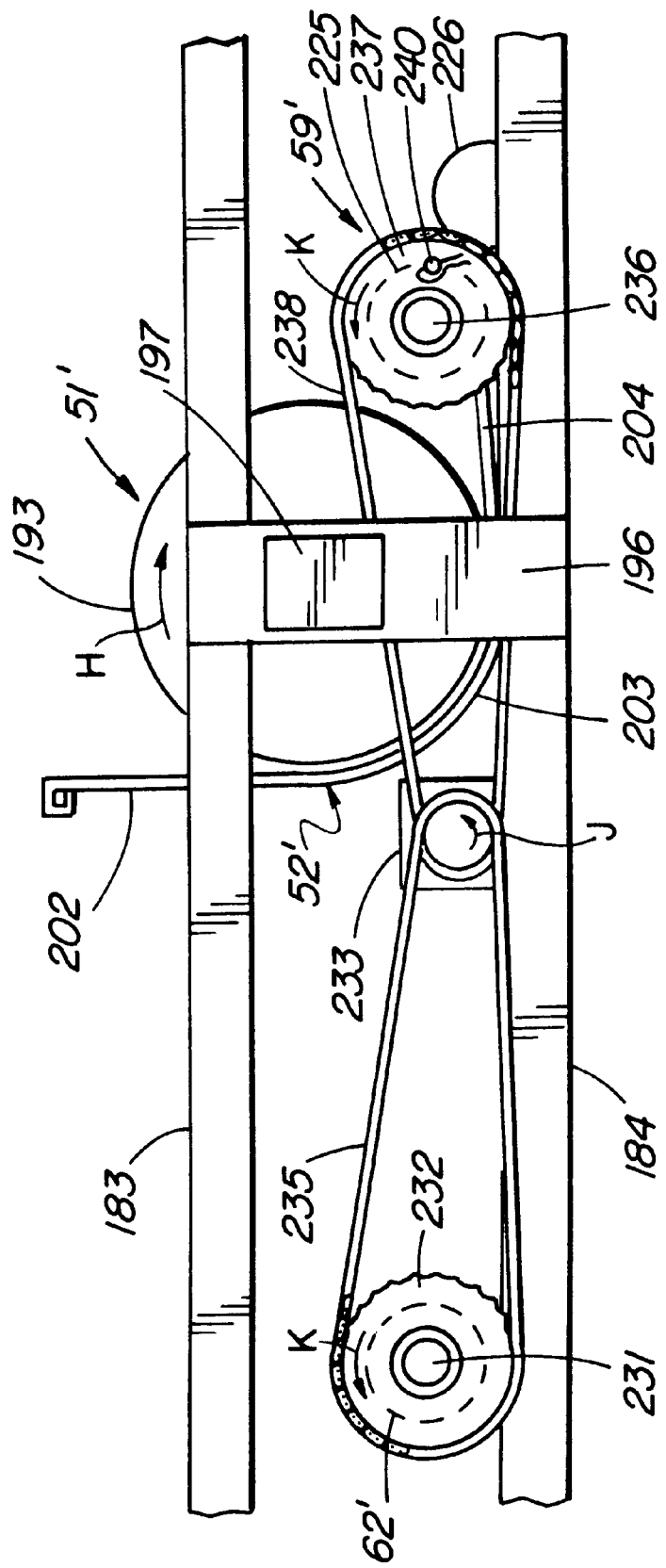
FIG. 14 is a right hand side view of a lower portion of the apparatus of FIG. 11 on an enlarged scale.

Roller 62' is mounted in bearing members 230 affixed to the top surface of lower beam 184 slightly forward of rear columns 180 of the main side components of the framework. It also extends the full width of the space between the main side components of the framework 11. Referring to FIG. 14, it is to be noted that affixed to the end of a shaft 231 of the roller 62' at the right side of the apparatus is a drive sprocket 232. A hydraulic motor 233, the operation of which is also controlled from the operator's station, is mounted on a platform (not shown) affixed to lower beam 184 behind the feed collecting means 51'. Affixed to the output shaft of the motor 233 are a pair of drive sprockets 234 adapted to turn in the direction of the arrow J when the motor is activated. Through a chain drive 235, the motor 233 thus rotates roller 62' in the direction of the arrow K when the motor is selectively operated.

Affixed to a shaft 236 integrally attached to the roller 225 is a disc (not shown). Adjacent to the disc is a sprocket 237 mounted to rotate on the shaft 236. The sprocket 237 is driven by a drive chain 238 extending between sprocket 237 and a second of the pair of sprockets 234 of the drive motor 233, and during normal operation of the apparatus 10' the sprocket 237 simply free-wheels on shaft 236 when the motor 233 is activated. The sprocket has a bore therethrough, however, which can be aligned with a bore in the above mentioned disc which is fixed to the shaft 236 of the roller 225, so that a pin 240 may be inserted in the aligned bores to cause the roller 225 to be driven also in the direction of the arrow K from sprocket 237 through the disc.

Figure 13:
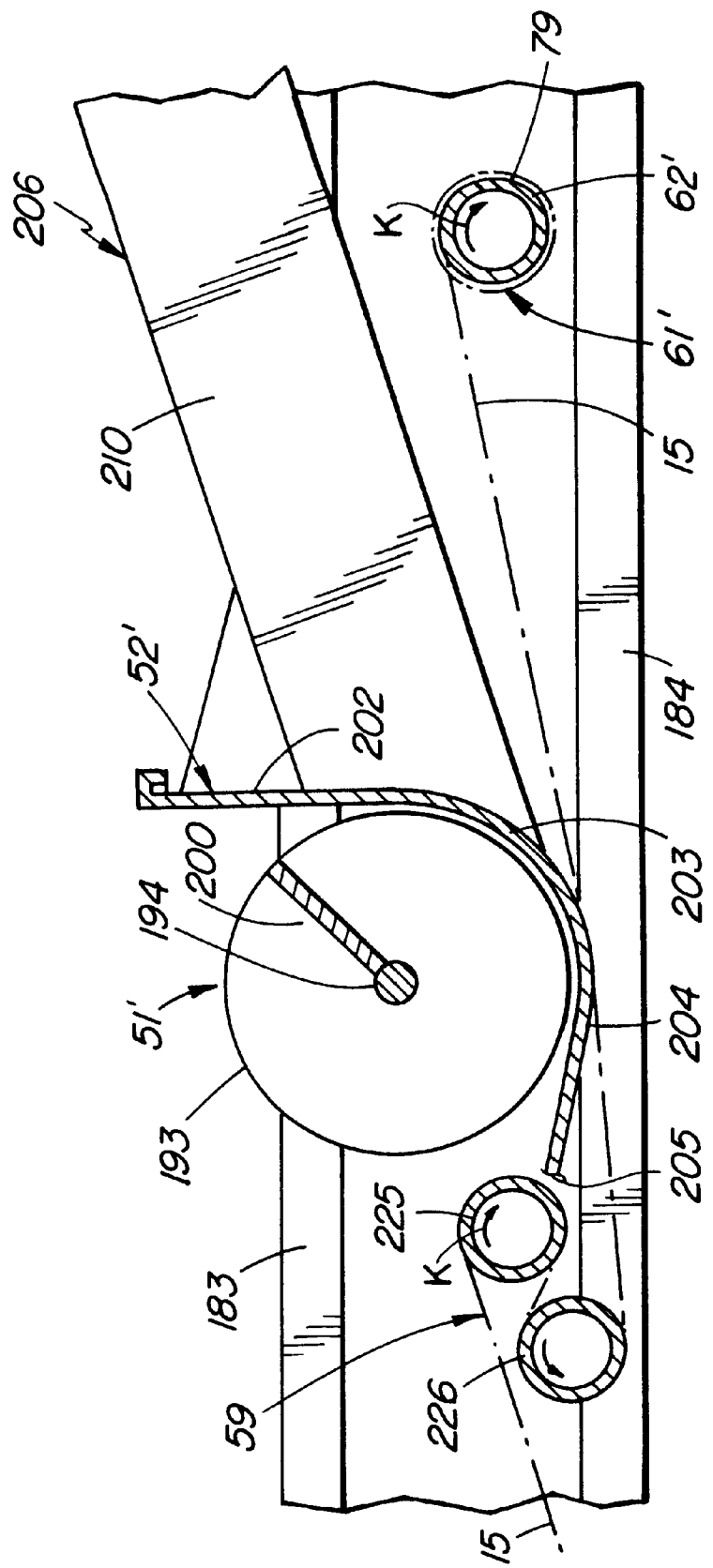
FIG. 13 is an enlarged sectional view as seen from the line 13—13 of FIG. 12, but showing only the apparatus advancing means, lower sheet storage means, and feed collecting and transporting means.

Normally, the lower portion 15 of the sheet plastic forming bag 13 is trained over the top of roller 225 and then passes forwardly and over roller 226 as shown in FIG. 13. The lower portion 15' then passing around roller 226 is directed under the bottom of trough member to the roller 62'. The lower portion 15 winds up on roller 62' to form the stored roll 79. During normal operation, when motor 233 is selectively operated, the winding up of the lower portion 15 of the sheet material 15 on roller 62', draws the sheet material around rollers 225 and 226 which are free to turn, and the pulling on the sheet materials causes the apparatus to be drawn forward as previously explained. The feed accumulated on lower portion 15 in front of roller 225, drops into the trough member 52' on rotation of roller 62'. The motor 233 is stopped after appropriate advancement of the apparatus 10' is achieved. As operation of the feed transfer means 32' is resumed, the fragmented feed is pushed back along the upper surface of the lower portion 15 to the area where it passes over roller 225 and at which point it falls into the trough members 52'. This feed is continuously conveyed to the mid portions of the trough member 52' from which it is delivered by rear feed means 206 to the rear of the apparatus.

However, when the apparatus 10' is brought to a new bag 13, the roller 225 of the elevating means 59' may be used at first as an apparatus advancing means in the event the lower portion 15 of the bag is relatively short. The end of lower portion 15 can be given an initial wrap on roller 225 and the pin 240 inserted to cause the roller 225 to be driven by motor 233. The advancing can thus be achieved in the same manner by actuating motor 233 to cause an initial roll to be formed on roller 225. After a short period of operation in this manner, the pin 240 is removed so that the accumulated roll can be unwound and then threaded around roller 226 as shown in FIG. 13 and wound on the roller 62' for continued storage there and advancement of the apparatus by the rotation of roller 62'.

It was described in connection with both roller 62 and upper roller 151 that the upper surfaces of these rollers could be provided with sharp projections for snagging the sheet plastic material to initiate the winding up action. Another form of an attachment to commence the wind-up of a roll, and one which would be preferably for temporary use with roller 225, is in the form of a clamp member (not shown). Such a clamp member could be substantially as long as the roller and be shaped of sheet steel of approximately semi-circular cross section having a radius slightly less than the outside of the roller. The sheet plastic need then be simply placed on the roller and the clamp member pushed down over the roller to entrap the sheet plastic between it and the roller. The resiliency of the sheet steel member provides a clamping effect sufficient to hold the sheet plastic for the first few turns of the roller after which the forming of the roll would in any event hold the clamp member in place.

Figure 15:
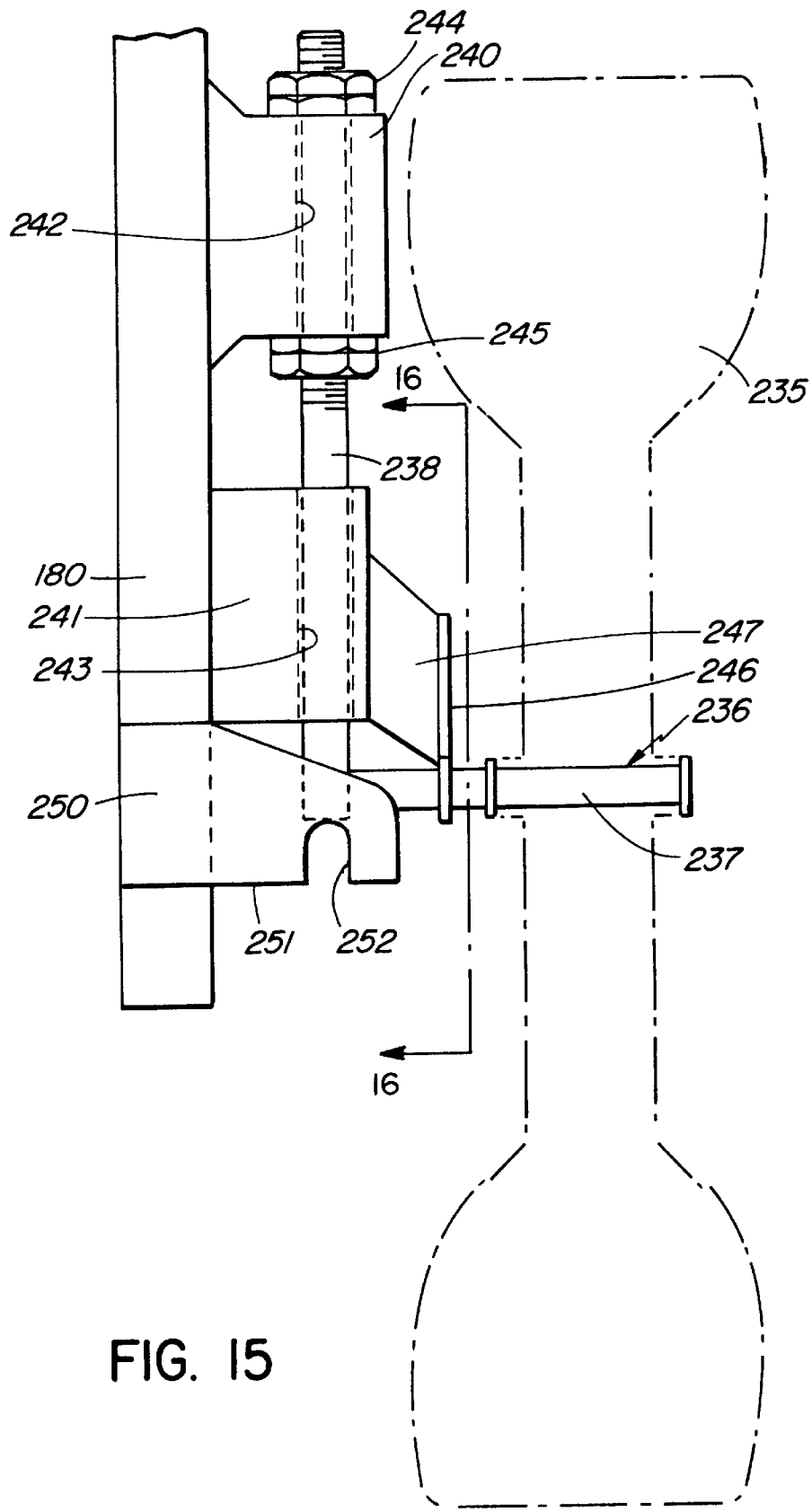
FIG. 15 is an enlarged view as seen from the line 15—15 of FIG. 12, showing a mounting arrangement for the rear right wheel of the apparatus of the present invention.
Figure 16:
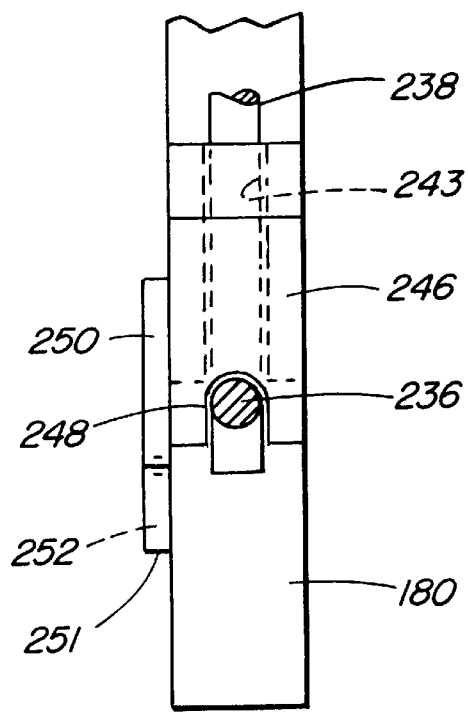
FIG. 16 is a cross-sectional view as seen from the line 16—16 of FIG. 15.

The apparatus 10' is mounted for travel over the ground surface on four wheels, one of a rear pair of wheels being attached to the two rear columns 180,180 and a front pair of wheels being attached to the two front columns 181,181. Unlike the previous embodiment of the invention, front wheels 232 and 233 are steerable, while rear wheels 234 and 235 are fixed for travel in the forward direction while the apparatus is in a normal working mode. However, like the earlier embodiment the front wheel and rear wheel at the right side of the apparatus can both be reoriented through 90° for road travel when a towing vehicle is attached to a towing tongue (not shown) affixed to the frame at the left side of the apparatus. The manner in which the four wheels are mounted on the four columns is somewhat different, and reference will be first given to the wheel 235 at the rear right of the apparatus as shown in more detail in FIGS. 15 and 16. The actual axle component shown at 236, which consists of a horizontal axle shaft 237 on which the wheel is rotatably mounted and a vertical king pin portion 238, may in fact be of common design for all four wheels. The axle shaft 237 and king pin portion 238 are integrally formed and during straight ahead travel the axle shaft 237 projects transversely from the column to which the wheel is attached, in the case of wheel 235, the rear right column 180. The vertical king pin portion 238 passes through aligned bores 242 and 243 in upper and lower brackets 240 and 241 which are affixed to the side of column 180. The upper end of king pin portion 238 is preferably threaded whereby lock nuts 244,245 may be threaded onto the king pin portion above and below the bracket 240 to allow for adjustment of the wheel 235 in a vertical direction relative to the framework 11' of which column 180 is a part. A plate 246 has a mounting portion 247 which is affixed to the lower bracket 241 and locates the plate 246 normal to the axis of the axle shaft 237 outwardly of the bracket 241. The lower portion of plate 246 extends below the bracket 241 and is provided with a slot 248 projecting upwardly from the lower edge thereof, the slot 248 being of a width sufficient to receive the axle shaft 237 as the king pin portion 238 is slid upwardly into the aligned bores 242 and 243 of the brackets 240 and 241. The reception of the axle shaft 237 in the slot 248 as shown in FIG. 16 prevents the king pin portion 238 from swivelling in the bores 242,243 so that the rear wheel 235 remains in a straight ahead orientation during normal operation of the apparatus 10'. To this point of the description of the mounting of wheel 235, the mounting structure for the rear left wheel 234 is the same so that wheel 234 is held in a straight ahead position at all times.

However, in order to permit the apparatus 10' to be pulled sideways when the left side of the apparatus 10' is raised by a towing vehicle, provisions are made to turn the axle shaft 237 of wheel 235 to a second position wherein the axle shaft 237 is on an axis extending rearwardly of the framework 11'. A vertically disposed plate member 250 is affixed to column 180 below bracket 241 and projects laterally from the outside of column 180. The plate 250 has a lower edge 251 upwardly from which extends a slot 252 also of a width for reception of the axle shaft 237. The slot 252 in the fore and aft direction of the apparatus is aligned with the axis of the bores 242 and 243. Accordingly when the nuts 244,245 are adjusted to let the axle component 236 drop a sufficient amount to permit the axle shaft 237 to swing under lower edge 251 of the plate 251, the axle component 236 can be pulled back up to cause the axle shaft 237 to enter slot 252 at which time the lock nuts 244,245 are readjusted to maintain the axle shaft in the slot 252. In this position the wheel 235 is held in a position to rotate about an axis permitting side-ways travel of the apparatus 10'.

In the apparatus 10' the front wheels 232,233 are provided with power steering means 253. For each of the front wheels, a steering arm 254 is affixed to an upper portion of king pin portion 238. A short post 255 is affixed to an upper surface of beam 183 behind the column 181 of each side from side component of the framework 11'. A hydraulic cylinder 256 is pivotally connected at one end to the post 255 and at the other end to an outer end of the steering arm 254 at each of the front wheels. The hydraulic cylinder 256 of the two power steering means 253 at either side of the apparatus are again controlled from the operator's station, and the two cylinders are connected in a slave relationship, wherein one cylinder 256 of the pair of hydraulic cylinders is hydraulically interconnected with the other so that on activation one cylinder contracts an appropriate amount while the other expands so that the steer of the front wheels 232,233 is synchronized.

There is provided in association with the front wheel 233, a plate 250a (FIG. 2) projecting from the adjacent front column 181, the plate 250a having a configuration like that of 250 so that on disconnection of the steering arm 254 of the front wheel 233, that front wheel can be swung to a position and fixed in that position for rotation about an axis extending in the fore and aft direction of the apparatus 10' to permit the apparatus to be towed sideways.

In order to facilitate the switching of wheels 233 and 235 between the normal operating condition and the reoriented axle positioning to permit road travel, it may be preferable to affix to the lower beams 184 of the main frame components at the right hand side of the framework, a hydraulically actuated jack means for contact with the ground when operated from the operator's station so as to selectively raise the right hand side of the apparatus.

As explained above, during operation of the apparatus 10', the lower end of an elevator 215 is normally located under the rear end of rear feed means 206 so that the feed discharged through opening 214 is then raised to a height by the elevator so as to dump into a wagon or the like. A conventional form elevator could be positioned to perform this function, but it is preferable to provide the apparatus 10' with a self contained rear elevating system as shown at 215 in FIG. 18 so that the apparatus 10' can be moved from site to site without the need of transporting additional equipment and to further provide an arrangement wherein the elevator 215 moves with the apparatus 10' as the advancing means 61' is activated during normal operating of the apparatus 10'.

Figure 18:
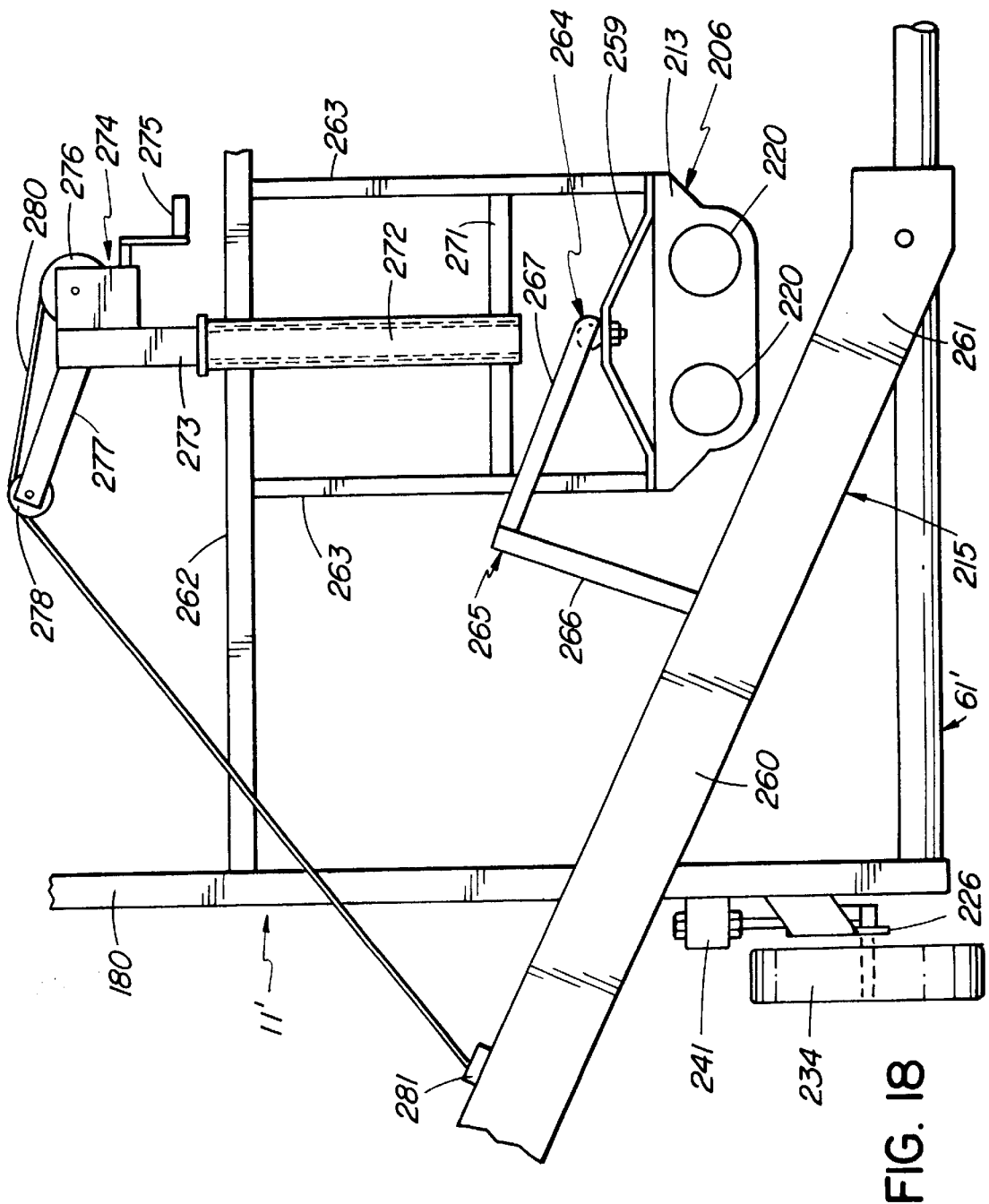
FIG. 18 is a view of the rear left portion of an embodiment of the invention provided with a self contained elevation system for delivery feed received from the rear feed conveyor of FIG. 16—16.

The elevator 215 illustrated in FIG. 18 includes an inclined trough portion 260, which may include an operating system of various types, such as an auger, a drag chain type, a continuous flexible belt, etc. driven by a hydraulic motor (not shown) controlled from the operator's station. The trough portion 260 has a lower, feed receiving end 261 located below the discharge end of the rear feed means 206, and an upper end (not shown) at a height capable of discharge into a receptacle, such as a feed wagon or the like. The inclined trough portion 260 is mounted on the rear part of the framework 11' in a fashion to allow adjustment of the height of its upper end and also to permit the inclined portion to swivel through 180° whereby the receptacle can be located in various positions relative to the apparatus 10'. This versatility makes it possible to empty a feed bag which may be located close to a neighbouring bag or even between two adjacent bags.

At the rear of the framework 11', there is provided an upper cross beam 262 extending between rear columns 180,180, depending from which is a pair of vertical hanger members 263,263 which support the rear end 207 of the rear feed means 206. A cross-bar 259 is affixed to the rear end 207 and has attached thereto a ball member of a ball and socket attachment 264. A rigid L-shaped support bracket 265 is connected to the trough member 260 slightly above its lower end 261 and incldues an upwardly projection portion 266 to which is rigidly affixed a laterally projecting portion 267. A socket portion of the ball and socket attachment is connected to the free end of the laterally projecting portion 267, whereby the lower end 261 of the elevator 217 is supported free of the ground in a fashion which allows the trough portion of the elevator to swing to any angle behind the apparatus 10', approximately through 180°.

The upper portion of the trough portion 260 is supported by way of a manually operable winch means 270 mounted on the framework provided for the support members of the rear feed means 206. Secured to cross beam 262 and a cross support member 271 affixed at opposite ends to hanger members 263,263 is an outer support tube 272 of circular cross section. An inner support tube 273 having an outer diameter sized to be rotatably received within the inner diameter of the outer support tube 272 is mounted within the outer support tube 273. A winch 274 is secured to the upper end of inner support tube 273, the winch 274 having a manually operable handle 275 for driving a cable storage reel 276. Extending outwardly from the side of the inner support tube is an arm 277 rotatably mounting a pulley 278 and over which is trained a cable 280. The cable 280 is wound on reel 276 at its inner end and is attached to a support bar 281 affixed to the trough portion 260 at its outer end. Reeling in of the cable 280 by operation of the winch 274 raises the upper end of the trough portion 260 as is permitted through the tilting of the socket on the ball of the ball and socket connection 264. As the trough is swung through its angular position relative to the back of the apparatus 10', the socket rotates on the ball of the ball and socket connection 264 and the inner support tube 273 is free to rotate within the outer support tube 272.

While various embodiments of the invention have been described, further variations of the features of the present invention within the spirit of the invention as defined in the appending claims will be obvious to those skilled in the art.

What I claim is:

1. An apparatus for removing compacted feed, such as silage and the like, from an open end of an agricultural feed storage bag of the type formed by elongated tubular flexible sheet material, said apparatus comprising:

a framework having a front part for facing the open end of said bag, ground engaging means supporting said framework for normal travel over the ground towards said open end of said bag in a direction substantially coinciding with a longitudinal axis of said bag, a conveyor system including a feed collecting means and a transporting means for carrying feed from said feed collecting means to an area of removal, said feed collecting means extending substantially across said framework and defining a forward edge toward said front part of said framework, a forwardly projecting feed transfer means for engaging the compacted feed exposed at the open end of said bag to thereby fragment said compacted feed and move the fragmented feed rearwardly to said feed collecting means, and an advancing means for drawing said framework over the ground towards said open end of said bag and in a direction of the longitudinal axis of said bag, said advancing means including:

lower roller means mounted on said framework for rotation about a transverse horizontal axis extending normal to said longitudinal axis of said bag, said lower roller means presenting an outer surface for driving engagement with a lower portion of said sheet material extending from beneath said compacted feed, a roller drive means for rotating said lower roller means to thereby develop a pull on said framework and move said framework toward said open end of said bag, said lower roller means further forming a sheet material raising means for directing said lower portion of said sheet material upwardly from the ground and adjacent said forward edge of said feed collecting means.

2. An apparatus as defined in claim 1, wherein said feed collecting means includes a feed collecting flight portion extending normal to the direction of travel of the framework, said collecting flight portion including an elongated, open top trough member extending substantially the width of the framework, and wherein said feed transfer means includes a rotating cylindrical member forward of said trough for engaging said compacted feed and discharging said feed in a fragmented form towards said trough member.

3. An apparatus as defined in claim 1, wherein said feed transfer means comprises;

a frame means having arm means forming a rear end portion mounted on a pivot means affixed to said framework for swinging movement of said arm means relative to said framework about a transverse pivot axis relative to the direction of travel of said framework, said arm means being formed by a pair of transversely spaced side arms together providing forward end portions and said rear end portions of said arm means, an elongated cylindrical member having an axis extending perpendicularly to the direction of travel of said framework and being rotatably mounted in journal means located on said forward end portions of said arms, drive means for rotating said cylindrical member in an operative direction of rotation to thereby fragment said compacted feed, and elevating means including an actuating means connected between said arm means and said framework for pivoting said side arm means about said rear end portion so as to thereby move said cylindrical member along an arcuate path between a first lowered position forward of said sheet raising portion of said advancing means and a raised position approximate a top surface of said compacted feed, said actuating means including a hydraulically actuated cylinder and piston type motor connected between said framework and at least one said side arms for raising and lowering said cylindrical member on expansion and contraction of said motor.

4. An apparatus as defined in claim 2, wherein said feed transfer means includes an elongated cylindrical member having an axis of rotation extending perpendicularly to the direction of travel of said framework, said cylindrical member being formed by an elongated drum having a cylindrical outer surface, and projections on said outer surface of said drum for engaging said compacted feed on rotation of said drum to thereby fragment said feed and force it rearwardly towards said feed collecting means.

5. An apparatus as defined in claim 4, wherein said projections include blades each formed by a plate member disposed in a plane substantially normal to a longitudinal axis of said drum, said blades being spaced from each other in substantially parallel relationship and disposed on a plurality of continuous lines extending axially substantially along the length of said drum, said continuous lines equally being spaced and spirally about said cylindrical outer surface of said drum.

6. An apparatus as defined in claim 4, wherein said projections each include a blade formed by a plate member, each blade having a central axis aligned on a radial line projecting from said longitudinal axis of said drum, said blades being arranged in a plurality of sets of blades, each set of blades including a plurality of blades each spaced along one of a plurality of continuous lines extending axially substantially along the length of said drum, said plurality of continuous axial lines being equally spaced circumferentially about said cylindrical outer surface of said drum and spiralling about said cylindrical outer surface, said central axis of each blade being in a substantial transverse plane of said drum spaced in an axial direction of the drum from the transverse plane of the central axis of the adjacent blade contained in the set of the next adjacent continuous axial line in the direction of rotation of said drum, whereby a leading edge of each blade defines a circumferential cut of said compacted feed separate of a circumferential cut of all other blades.

7. An apparatus as defined in claim 6, wherein at least some of said blades are turned slightly about the central axes thereof relative to the transverse plane normal to said central axis in order that a trailing edge of said at least some blades in relation to said direction of rotation of said drum is closer to a mid-point of said drum than a leading edge of the same blade, whereby on rotation of said drum, feed fragmented by said blades engaging said compacted feed is propelled generally in a rearward direction having a component directed away from opposite ends of said drum.

8. An apparatus as defined in claim 2, wherein said trough member is in the form of a channel having a substantially horizontal bottom panel a length extending transversely the width of said framework and providing said area of removal at one side of said framework, said transporting means includes an upper flight of a first conveyor means for transverse movement relative to said framework along said bottom panel, and said first conveyor means includes an inclined portion continuing from said area of removal to a raised discharge end beyond said one side of said apparatus.

9. An apparatus as defined in claim 8, and further comprising a second conveyor means including:

an inlet end disposed adjacent said areas of removal of said feed collecting means, an inclined flight portion extending rearwardly of said framework in a direction substantially parallel to the direction of travel of said framework, and a raised discharge end located rearward of said framework.

10. An apparatus as defined in claim 2, wherein said area of removal of said first feed collecting means is intermediate opposite ends of said trough member, and said transporting means includes:

driven conveying means within said trough member for movement of said feed in opposite directions from opposite ends of said trough to said area of removal intermediate said opposite ends, and wherein said conveyor system includes an inclined rear feed conveyor having an inlet means at said area of removal for conveying feed to a raised discharge end of said rear feed conveyor rearwardly of said framework.

11. An apparatus as defined in claim 10, wherein said transport means includes:

a pair of auger flights in said trough member, one each of said flights being on opposite sides of said area of removal, said pair of auger flights being driven from a common shaft, said auger flights having oppositely wound auger flights so as to convey feed in opposite directions and towards said feed means on rotation of said common shaft in one direction.

12. An apparatus as defined in claim 11, and further comprising elevator means carried on said framework rearwardly of said rear feed conveyor and having a lower loading end for receiving feed from the raised discharge end of said rear feed conveyor and an upper delivery end for dispersing said feed in a receptacle, mounting means connecting said elevator means to said framework for a substantially 180° swing movement of said elevator means about a vertical axis passing through said lower loading end.

13. An apparatus as defined in claim 1, wherein said roller means is disposed immediately in front of said conveyor means and provides said sheet raising means, whereby as a roll of sheet material is formed on said roller means and said framework moves in the direction of travel due to rotation of said roller means, feed remaining on said lower portion of sheet material is dumped into said collecting means, and an upper surface of said lower portion of sheet material provides a delivery surface for supporting movement of fragmented feed being moved rearwardly by said feed transfer means.

14. An apparatus as defined in claim 1, and further comprising:

an elevated frame portion at said front part of said framework, attachment means connecting said elevated frame portion to said framework, a first sheet storage means including:

an upper roller on said elevated frame and extending substantially the width of said framework said upper roller being mounted for rotation about a longitudinal, horizontal, central axis thereof extending transversely relative to the direction of travel of said framework, and an upper roller drive means for rotating said upper roller to thereby collect a roll thereon of an upper portion of said sheet material of said bag, whereby said upper portion of said sheet material is stretched above said feed exposed at the open end of said bag.

15. An apparatus as defined in claim 14, wherein said attachment means includes adjustment means for varying the height of said elevated frame portion and said upper roller mounted therein above the ground.

16. An apparatus as defined in claim 14, wherein said lower roller means of said advancing means forms a second sheet storage means for forming a roll thereon of said lower portion of said sheet material as said lower roller means is rotated to pull said framework forward, whereby said tubular sheet material forming said bag may be split longitudinally only along opposite sides of said bag forward of said front part of said framework to separately form said upper and lower portions of said sheet material to be wound upon and separately form rolls of stored sheet material on said upper roller and said lower roller means, respectively.

17. An apparatus as defined in claim 16 wherein said lower roller means and said upper roller means have a plurality of sharp projections along the length thereof providing snags for initially catching said lower and upper portions of said sheet material, respectively.

18. An apparatus as defined in claim 14, and further including:

an upper roller relocating means for selectively shifting said upper roller from a forward operating position to a rearward inoperative position, above and behind said feed collecting means, whereby in said inoperative position, said upper portion of said sheet material is stretched between said bag and said upper roller to thereby provide a cover for said fragmented feed and said collecting means.

19. An apparatus as defined in claim 18, wherein said elevated framework includes a pair of upright posts connected by said attachment means to said framework of said apparatus, said posts having bearing means for rotatably supporting opposite ends of said upper roller, said attachment means includes means pivotally connecting lower ends of said posts for swinging movement about a transverse axis, and wherein said relocating means includes positioning means for holding said posts in at least two positions for locating said upper roller in either of said forwarding operative positions and said rearward inoperative position.

20. An apparatus as defined in claim 19, wherein said positioning means includes at least one hydraulically activated cylinder and piston type motor connected between said elevated frame portion and said framework of said apparatus, whereby actuation of said motor swings said posts between said at least two positions.

21. An apparatus as defined in claim 2, wherein a forward side of said trough member forms said forward edge, said lower roller means includes a first elongated roller extending substantially across the width of said framework rearward of and parallel to said collecting flight portion, and said sheet raising portion of said advancing means includes a second roller mounted immediately forward of said trough member and parallel to said forward edge for free rotation relative to the framework, said second roller defining an upper peripheral surface at least as high as said forward edge, whereby the path of travel of said lower portion of sheet material relative to said framework passes upwardly from the ground, over said second roller, downwardly in front of said trough member, under said trough member, and onto said lower roller to thereby form a stored roll of sheet plastic on said lower roller.

22. An apparatus for removing compacted feed, such as silage and the like, from an open end of an agricultural feed storage bag of the type formed by elongated tubular flexible sheet material, said apparatus comprising:

a framework having a front part for facing the open end of said bag:

ground engaging means supporting said framework for normal travel over the ground towards said open end of said bag in a direction of travel substantially coinciding with a longitudinal axis of said bag, said ground engaging means including:

wheel means mounted at either side of said framework on axles having axes of rotation projecting perpendicular to said direction of travel of the framework toward said open end of said bag, a front pair of wheels of said wheel means on either side of said framework located at said front part of said framework and mounted on fixed axles, and a rear pair of wheels of said wheel means on either side of said framework rearward of the front pair and each being mounted on axles having mounting means for swivel about a substantially vertical axis relative to said framework;

steering means for fixing a direction of swivel of said rear pair of wheels relative to said longitudinal axis of said bag, said steering means includes:

adjustment means for selectively fixing a position of steer of one of said rear wheels, and a tie rod connecting the mounting means of said rear pair of wheels whereby a direction of travel of said rear pair of wheels is fixed by said adjustable means;

a conveyor system including a feed collecting means and a transporting means for carrying feed from said feed collecting means to an area of removal, said feed collecting means extending substantially across said framework and defining a forward edge toward said front part of said framework;

a forward projecting feed transfer means for engaging the compacted feed exposed at the open end of said bag to thereby fragment said compacted feed and move the fragmented feed rearwardly to said feed collecting means; and an advancing means for drawing said framework over the ground towards said open end of said bag and in a direction of the longitudinal axis of said bag, said advancing means including:

lower roller means mounted on said framework for rotation about a transverse horizontal axis extending normal to said longitudinal axis of said bag, said lower roller means presenting an outer surface for driving engagement with a lower portion of said sheet material extending from beneath said compacted feed, a roller drive means for rotating said lower roller means to thereby develop a pull on said framework and move said framework toward said open end of said bag, said lower roller means further forming a sheet material raising means for directing said lower portion of said sheet material upwardly from the ground and adjacent said forward edge of said feed collecting means.

23. An apparatus as defined in claim 22, and further comprising
 a tongue means projecting from one side of said framework for connection to a draft vehicle,
 said tongue means being rigidly connected to said framework to permit raising of said one side of said apparatus by said draft vehicle, and
  one of said front pair of wheels on a side of said framework opposite said tongue means is provided with axle mounting means permitting alternative attachment of said axle thereof on an axis parallel to said direction of said normal travel,
 whereby said one of said front pair of wheels may be mountable at right angle to the normal orientation thereof during said normal travel to thereby permit road travel.

24. An apparatus for removing compacted feed, such as silage and the like, from an open end of an agricultural feed storage bag of the type formed by elongated tubular flexible sheet material, said apparatus comprising:
 a framework having a front part for facing said open end of said bag,
 ground engaging means supporting said framework for normal travel over the ground towards said open end of said bag in a direction substantially coinciding with a longitudinal axis of said bag,
 an open topped, feed collecting trough member extending substantially the width of said framework adjacent said front part of said framework and presenting a forward transverse edge,
 conveyor means for transporting feed from said trough member to an area of removal,
 a framework advancing means including a lower roller means mounted on said framework immediately forward of said transverse upper edge and parallel thereto,
 said roller means presenting an outer surface for driving engagement with a lower portion of said sheet material extending from beneath said compacted feed, and
 first drive means for rotating said lower roller means to thereby develop a pull on said framework towards said open end of said bag; and
 a feed comminuting and transfer means including;
 arm means having a rear end portion mounted on pivot means carried by said framework above and rearwardly said trough member and a forward end portion extending forwardly of said trough member,
 a transversely extending cylindrical member having projections thereon and mounted for rotation on said forward end portion of said arm means,
 second drive means for rotating said cylindrical member for fragmenting said compacted feed, and
 elevating means for pivoting said arm means about said rear end portion to thereby move said cylindrical member along an arcuate path between a raised position proximate a top surface of said compacted feed and a lowered position forward of said roller means.

25. An apparatus as defined in claim 24, wherein
 said cylindrical member is in the form of an elongated drum defining a cylindrical outer surface, and
 each of said projections is formed by a relatively flat blade disposed in a transverse plane substantially normal to a longitudinal axis of said drum,
 said blades being in sets of blades with each set of blades including a plurality of blades spaced along one of a plurality of continuous axial extending lines,
 said axial extending lines being equally spaced in the circumferential direction about the drum and spiraling about said cylindrical outer surface,
 each blade having a central axis thereof aligned on a radial line projecting from said longitudinal axis of said drum, and
 at least some of said blades being slightly turned about said central axis thereof relative to the said transverse plane in order that a trailing edge of each of said at least some blades relative to the direction of rotation of said drum is closer to a mid point of said blade than a leading edge of the same blade, whereby
 on rotation of said drum, feed fragmented from said compacted feed is propelled from said compacted feed in a direction having a component directed away from opposite ends of said drum.

26. An apparatus for removing compacted feed, such as silage and the like, from an open end of an agricultural feed storage bag of the type formed by elongated tubular flexible sheet material, said apparatus comprising:
 a framework having a front part for facing said open end of said bag;
 ground engaging means support ing said framework for normal travel over the ground towards said open end of said bag in a direction substantially coinciding with a longitudinal axis of said bag,
 said ground engaging means including:
 wheel means mounted at either side of said framework for free rotation on axles each having an axis of rotation projecting perpendicular to the direction of normal travel of said framework toward said open end of said bag,
 a front pair of wheels of said wheel means on either side of said framework being located at said front part of said framework and mounted on fixed axles, and
 a rear pair of wheels of said wheel means on either side of said framework rearward of said front pair of wheel means being mounted on axles connected to said framework by swivel means permitting turn of said rear pair of wheels relative to said framework about a substantially vertical axis;
 steering means for selectively fixing a direction of swivel of said rear pair of wheels relative to said framework,
 said steering means including:
 adjustment means for fixing a position of steer of said swivel means of one of said rear wheels relative to said framework, and
 a tie rod connecting said swivel means of said one of said rear wheels to the swivel means of the other of said rear wheels,
 whereby selective positioning of said adjustment means coordinates steer of said rear pair of wheels to thereby establish the direction of travel of said apparatus for maintaining said normal travel of said framework in a direction of the longitudinal axis of said bag;
 an open topped, feed collecting trough member extending substantially the width of said framework adjacent said front part of said framework and presenting a forward transverse edge;
 conveyor means for transporting feed from said trough member to an area of removal;
 a framework advancing means including:
 a lower roller means mounted on said framework immediately forward of said transverse upper edge and parallel thereto, said roller means presenting an outer surface for driving engagement with a lower portion of said sheet material extending from beneath said compacted feed, and first drive means for rotating said lower roller means to thereby develop a pull on said framework towards said open end of said bag; and a feed comminuting and transfer means including:

arm means having a rear end portion mounted on pivot means carried by said framework above and rearwardly said trough member and a forward end portion extending forward of said trough member, a transversely extending cylindrical member having projections thereon and mounted for rotation on said forward end portion of said arm means, second drive means for rotating said cylindrical member for fragmenting said compacted feed, and elevating means for pivoting said arm means about said rear end portion to thereby move said cylindrical member along an arcuate path between a raised position proximate a top surface of said compacted feed and a lowered position forward of said roller means.

27. An apparatus for removing compacted feed, such as silage and the like, from an open end of an agricultural feed storage bag of the type formed by elongated tubular flexible sheet material, said apparatus comprising, a framework including transversely spaced, main side components each having a front column and a rear column;

a front end of said apparatus for facing said open end of said bag being defined between the front columns of said side components of said framework;

a wheel means supporting said framework for normal travel in a direction towards said open end of said bag and including a pair of front wheels one each mounted adjacent one of said front columns and a pair of rear wheels one each mounted adjacent said rear columns;

steering means for swivelling said front wheels about substantially vertical axes for directing said apparatus during normal operation on a path substantially coinciding with a central axis of said bag;

a forwardly projecting feed transfer means for engaging the compacted feed exposed at the open end of said bag to fragment said feed and move the fragmented feed rearward from the compacted feed;

a transversely extending feed collecting and conveying means behind said feed transfer means for receiving the fragmented feed from said transfer means and moving said fragmented feed to an area of removal from said apparatus, and an advancing means for drawing said framework towards said open end of said bag including a first roller means having drive means for rotating said first roller about a transverse axis perpendicular to the direction of normal travel, said first roller means having an outer surface for engagement with a lower portion of said sheet material extending beneath said compacted feed and developing a pull on said framework on rotation of said first roller means.

28. An apparatus as defined in claim 27, wherein said first roller means is mounted at opposite ends on said side components rearwardly of said feed collecting and providing rolling-up means for said lower portion of said sheet material to thereby form a sheet material storage means.

29. An apparatus as defined in claim 28, wherein said feed collecting and conveying means includes an open top trough member, and further comprising a sheet material raising means extending transversely between said side components of said framework, immediately in front of said feed collecting and conveying means.

30. An apparatus as defined in claim 29, wherein said trough member has a forward edge extending between said side components of said framework, and said sheet material raising means comprising a second roller mounted for rotation about a transverse axis in front of said forward edge of said trough member, said roller defining an upper periphery located at a height at least as high as said forward edge of said trough member, whereby said lower portion of said sheet material raises to pass over said second roller prior to passing under said trough member enroute to storage on such first roller.

31. An apparatus as defined in claim 27, and including swivel means associated with the front and rear wheels at one side of said apparatus for permitting adjustment of such wheels to a road travel position for rotation of said front and rear wheels about an axis parallel to said direction of normal travel of said apparatus, and lock means for holding said wheels at said one side in said position on said road travel position, whereby on lifting the opposite side of said apparatus, road travel of said apparatus in a direction normal to said normal travel is permitted.

* * * * *